(12) United States Patent
Tachibana et al.

(10) Patent No.: US 12,275,223 B2
(45) Date of Patent: Apr. 15, 2025

(54) JOINT MEMBER AND METHOD FOR PRODUCING JOINT MEMBER

(71) Applicant: MITSUBISHI HEAVY INDUSTRIES, LTD., Tokyo (JP)

(72) Inventors: Takahiro Tachibana, Tokyo (JP); Ryouji Okabe, Tokyo (JP); Masami Kamiya, Tokyo (JP); Yasunori Watanabe, Tokyo (JP); Koichi Hasegawa, Tokyo (JP); Yuichi Yui, Tokyo (JP); Akihisa Okuda, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 938 days.

(21) Appl. No.: 17/354,382

(22) Filed: Jun. 22, 2021

(65) Prior Publication Data
US 2021/0404497 A1    Dec. 30, 2021

(30) Foreign Application Priority Data

Jun. 25, 2020  (JP) ................................ 2020-109300

(51) Int. Cl.
*B32B 5/12* (2006.01)
*B29C 65/48* (2006.01)
(Continued)

(52) U.S. Cl.
CPC ............... *B32B 5/12* (2013.01); *B29C 65/48* (2013.01); *B32B 1/08* (2013.01); *B32B 3/06* (2013.01);
(Continued)

(58) Field of Classification Search
CPC .... B32B 3/06; B32B 7/14; B32B 3/30; B32B 15/043; B32B 2260/02–023; B32B 5/12;
(Continued)

(56) References Cited

U.S. PATENT DOCUMENTS

| | | | |
|---|---|---|---|
| 2017/0136738 A1 | 5/2017 | Koga et al. | |
| 2020/0269479 A1 | 8/2020 | Tachibana et al. | |
| 2022/0203651 A1* | 6/2022 | Matsumoto | ............. B32B 15/08 |

FOREIGN PATENT DOCUMENTS

| | | |
|---|---|---|
| JP | 2012-187861 | 10/2012 |
| JP | 2020-131646 | 8/2020 |

(Continued)

OTHER PUBLICATIONS

Thermal Vac, "Why Choose Brazing Over 3D Printing?" Oct. 8, 2019 https://www.thermalvac.com/news/2019/why-choose-brazing-over-3d-printing (Year: 2019).*

(Continued)

*Primary Examiner* — Frank J Vineis
*Assistant Examiner* — Nicole T Gugliotta
(74) *Attorney, Agent, or Firm* — Wenderoth, Lind & Ponack, L.L.P.

(57) ABSTRACT

A joint member according to at least one embodiment of the present disclosure includes a resin member, and a metal member which includes a base material, and a cubic lattice part formed on a surface of the base material and embedded with the resin member. The cubic lattice part includes a plurality of lattice points and a plurality of arms connecting the lattice points, respectively. Of the plurality of lattice points, an outermost lattice point far from the surface of the base material includes at least three lattice points forming an inclined surface with respect to the surface.

15 Claims, 24 Drawing Sheets

(51) Int. Cl.
*B32B 1/08* (2006.01)
*B32B 3/06* (2006.01)
*B32B 3/26* (2006.01)
*B32B 3/30* (2006.01)
*B32B 7/04* (2019.01)
*B32B 15/01* (2006.01)
*B32B 15/04* (2006.01)
*B32B 15/08* (2006.01)

(52) U.S. Cl.
CPC ............... *B32B 3/263* (2013.01); *B32B 3/30* (2013.01); *B32B 7/04* (2013.01); *B32B 15/043* (2013.01); *B32B 15/08* (2013.01); *B32B 2255/06* (2013.01); *B32B 2260/02* (2013.01); *B32B 2305/38* (2013.01)

(58) Field of Classification Search
CPC ............... B32B 7/04–08; B32B 3/28; B32B 15/08–098; B32B 2255/06–062; B32B 7/12–14; B32B 2305/38; B29C 65/48; B29C 66/5223; F16L 9/147
See application file for complete search history.

(56) References Cited

FOREIGN PATENT DOCUMENTS

| | | |
|---|---|---|
| WO | 2016/010017 | 1/2016 |
| WO | 2017/082207 | 5/2017 |
| WO | WO-2017177322 A1 * | 10/2017 ............. B32B 15/00 |

OTHER PUBLICATIONS

Notice of Reasons for Refusal issued Jan. 9, 2024 in corresponding Japanese Application No. 2020-109300, with English-language machine translation.

* cited by examiner

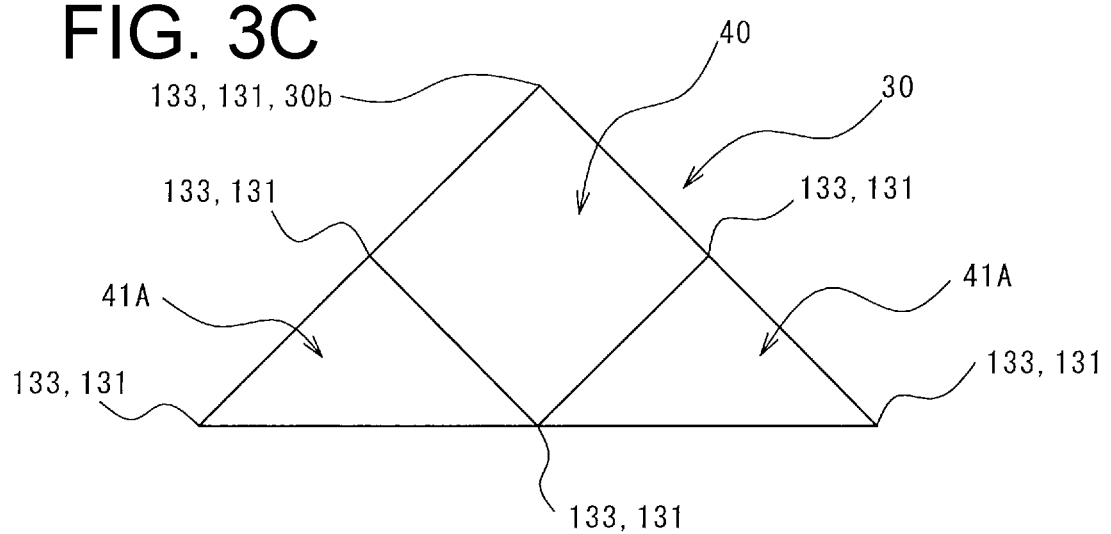

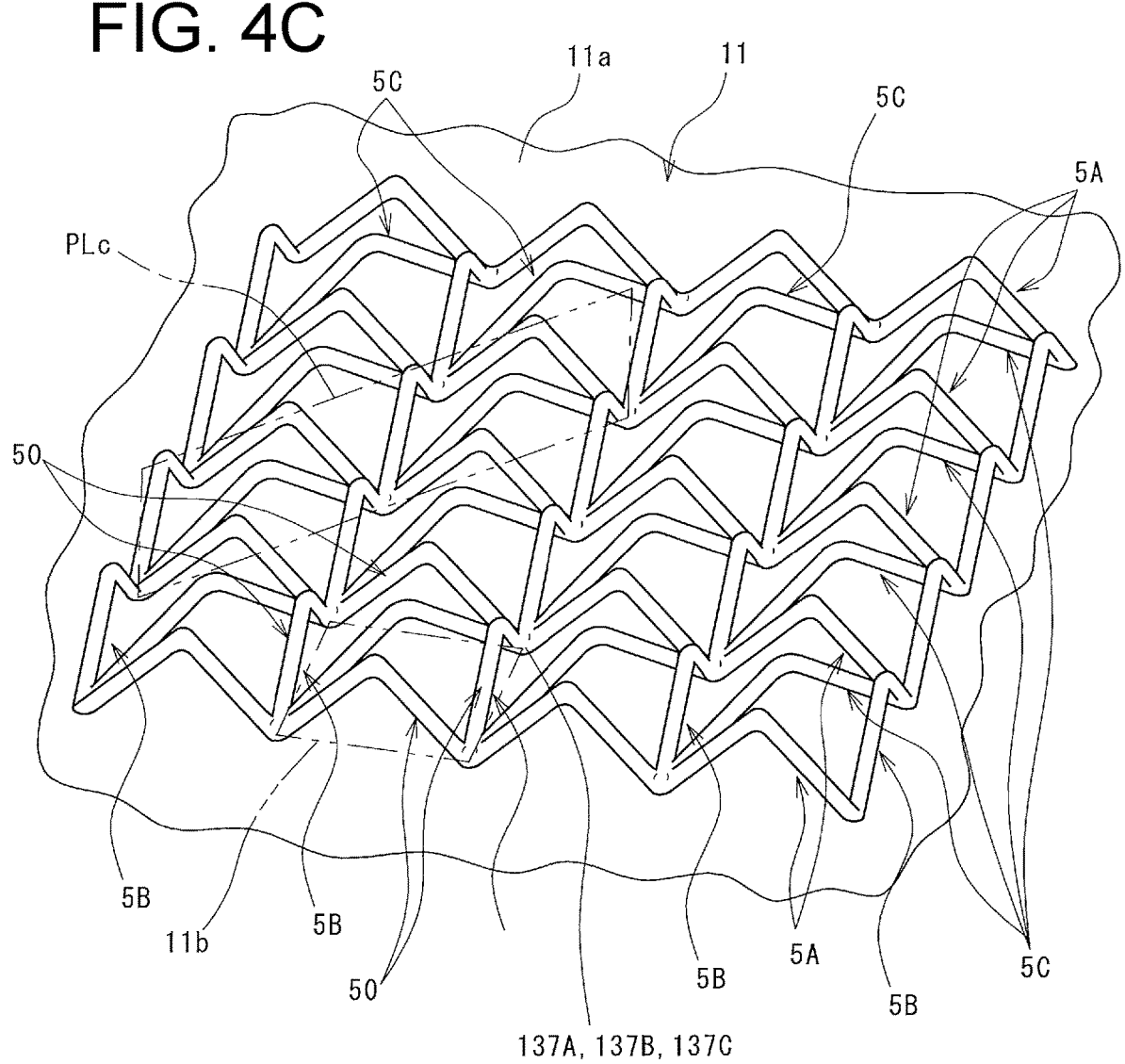
FIG. 4C
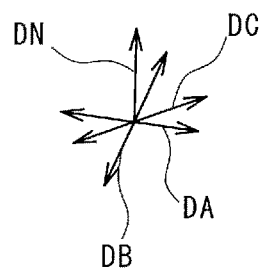

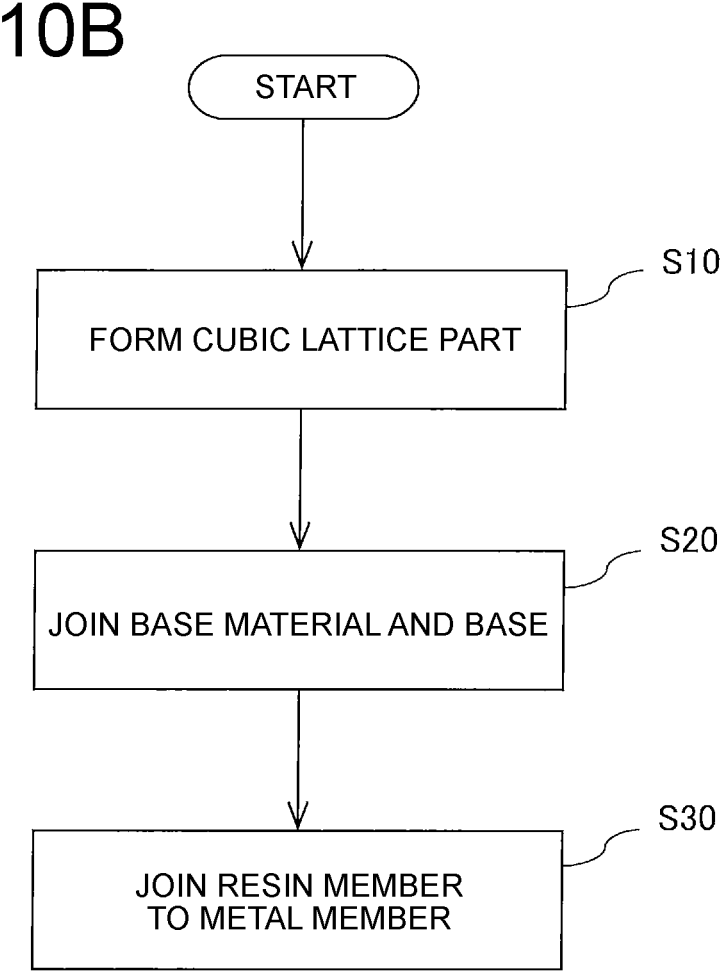

JOINT MEMBER AND METHOD FOR PRODUCING JOINT MEMBER

TECHNICAL FIELD

The present disclosure relates to a joint member and a method for producing the joint member.

The present application claims priority on Japanese Patent Application No. 2020-109300 filed Jun. 25, 2020, the entire content of which is incorporated herein by reference.

BACKGROUND

For example, a joint member obtained by joining a metal material and a resin material can be used for various purposes as a material combining the characteristics of a metal and the characteristics of a resin. In such a joint member of the metal material and the resin material, it is necessary to join different kinds of materials of the metal and the resin at a sufficient joint strength.

However, a bonding strength at a joint interface between the metal and the resin may be decreased by, for example, occurrence of metal oxidation or the like due to an influence of moisture present at the joint interface.

Thus, as a technique of ensuring the joint strength between the metal material and the resin material without depending on the bonding strength at the joint interface between the metal and the resin, disclosed is, for example, a technique of joining a thermoplastic resin layer and a metal material by providing the surface of the metal material with a fine porous structure and introducing a thermoplastic resin into the porous structure (for example, see Patent Document 1).

CITATION LIST

Patent Literature

Patent Document 1: JP2012-187861A

SUMMARY

Consider a case where, as a joint member produced by a production method described in Patent Document 1, a joint member, which includes a metal member with a layer of a porous structure being formed on the surface of a base material and a resin member with a resin entering into the layer of the porous structure, is pulled in a direction in which, for example, the metal member and the resin member are separated from each other.

In this case, a metal portion of a metal portion constituting the porous structure present in a region close to the base material bears, in addition to a load acting on the metal portion present in the said region, a load acting on a metal portion present in a region far from the base material relative to the said region.

Likewise, a resin of the resin entering into the porous structure present in a region far from the base material of the metal member bears, in addition to a load acting on the resin present in the said region, a load acting on a resin present in a region close to the base material of the metal member relative to the said region.

Therefore, in the metal portion constituting the porous structure, the burden of the load increases toward the base material. Moreover, in the resin entering into the porous structure, the burden of the load increases with distance from the base material of the metal member.

Thus, a reduction in burden of the load in the above-described region where the burden of the load increases contributes to an improvement in joint strength of the joint member.

In view of the above, an object of at least one embodiment of the present disclosure is to improve the joint strength of the joint member.

(1) A joint member according to at least one embodiment of the present disclosure includes a resin member, and a metal member which includes a base material, and a cubic lattice part formed on a surface of the base material and embedded with the resin member.

The cubic lattice part includes a plurality of lattice points and a plurality of arms connecting the lattice points, respectively. Of the plurality of lattice points, an outermost lattice point far from the surface of the base material includes at least three lattice points forming an inclined surface with respect to the surface.

(2) A joint member according to at least one embodiment of the present disclosure includes a resin member, and a metal member which includes a base material, and a cubic lattice part formed on a surface of the base material and embedded with the resin member. The cubic lattice part includes a plurality of lattice points, and a plurality of arms connecting the plurality of lattice points and the surface of the base material. The plurality of lattice points are each a connection point of respective tip ends of two arms extending toward the lattice point from a side of the base material.

(3) A cubic lattice member according to at least one embodiment of the present disclosure at least includes a first unit member, a second unit member, a third unit member, and a fourth unit member each including metallic two arms which, respectively, have end portions on one side connected to each other and have end portions on another side separated from each other, the two arms forming an angle of less than 180 degrees. The first unit member, the second unit member, the third unit member, and the fourth unit member are connected to each other in the end portion on the another side of one of the two arms in each of the first unit member, the second unit member, the third unit member, and the fourth unit member. A first plane where the two arms in the first unit member are included is the same as a second plane where the two arms in the second unit member are included. A third plane where the two arms in the third unit member are included is the same as a fourth plane where the two arms in the fourth unit member are included, and is different from the first plane and the second plane.

(4) A method for producing a joint member according to at least one embodiment of the present disclosure includes a step of forming a cubic lattice part on a surface of a base material in a metal member, and a step of joining a resin member to the metal member by embedding the cubic lattice part with a resin. The step of forming the cubic lattice part includes forming the cubic lattice part to include a plurality of lattice points and a plurality of arms connecting the lattice points, respectively, as well as forming the cubic lattice part such that, of the plurality of lattice points, an outermost lattice point far from the surface of the base material includes at least three lattice points forming an inclined surface with respect to the surface.

According to at least one embodiment of the present disclosure, it is possible to improve a joint strength of a joint member.

BRIEF DESCRIPTION OF DRAWINGS

FIG. 3C is a schematic view for describing a protruding part.

FIG. 4C is a perspective view showing a portion of the cubic lattice part according to still another embodiment.

FIG. 10B is a flowchart showing a procedure of the method for producing the joint member according to another embodiment.

DETAILED DESCRIPTION

Figure 1:
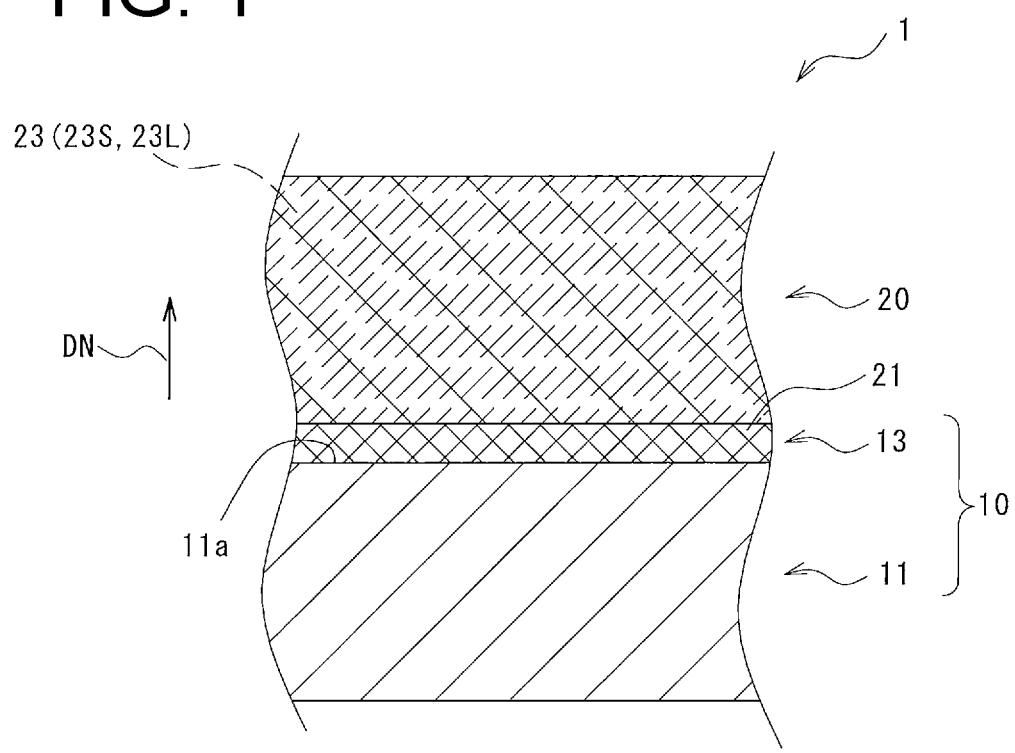
FIG. 1 is a view schematically showing the cross-section of a joint member according to some embodiments.

Embodiments of the present disclosure will be described below with reference to the accompanying drawings. It is intended, however, that unless particularly identified, dimensions, materials, shapes, relative positions and the like of components described or shown in the drawings as the embodiments shall be interpreted as illustrative only and not intended to limit the scope of the present disclosure.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same", "equal", and "uniform" shall not be construed as indicating only the state in which the feature is strictly equal, but also includes a state in which there is a tolerance or a difference that can still achieve the same function.

Further, for instance, an expression of a shape such as a rectangular shape or a tubular shape shall not be construed as only the geometrically strict shape, but also includes a shape with unevenness or chamfered corners within the range in which the same effect can be achieved.

On the other hand, the expressions "comprising", "including", "having", "containing", and "constituting" one constituent component are not exclusive expressions that exclude the presence of other constituent components.

FIG. 1 is a view schematically showing the cross-section of a joint member according to some embodiments.

Figure 2A:
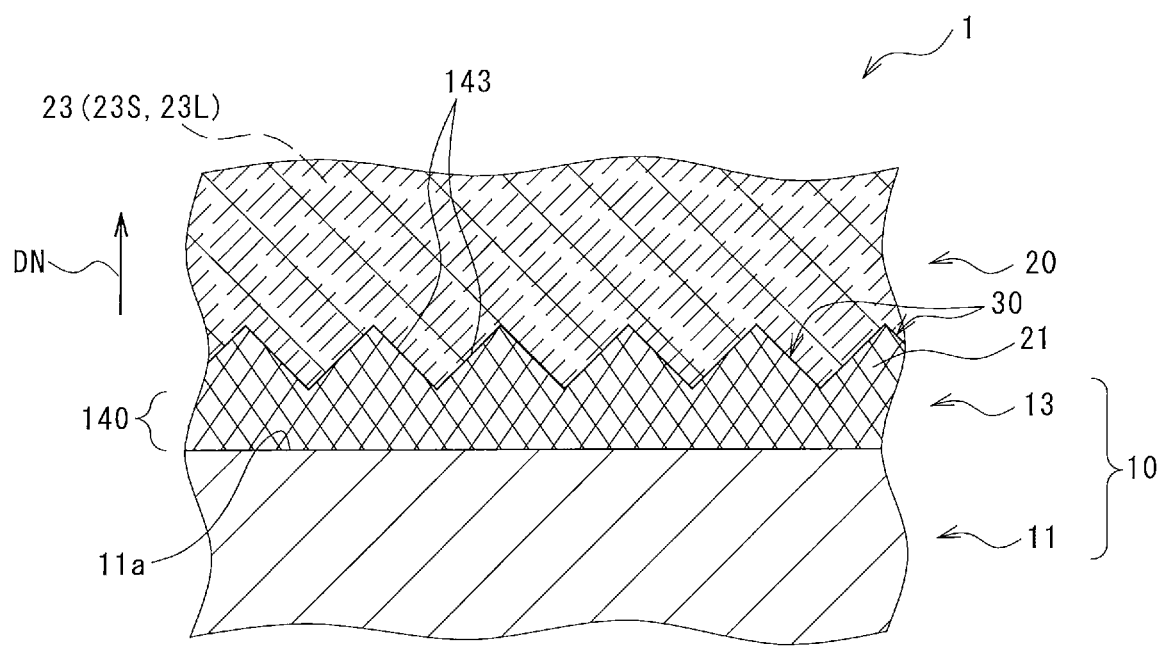
FIG. 2A is a schematic cross-sectional view showing an overall shape regarding an example of a cubic lattice part to be described later of the joint member shown in FIG. 1.

FIG. 2A is a schematic cross-sectional view showing an overall shape regarding an example of a cubic lattice part to be described later of the joint member shown in FIG. 1.

Figure 2B:
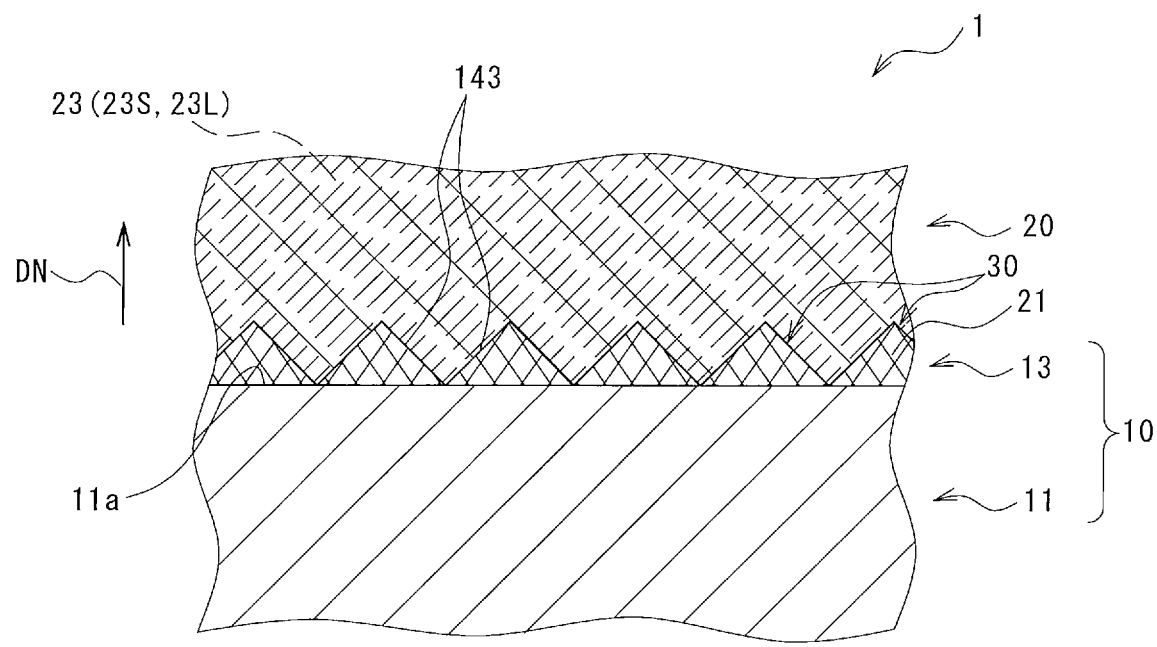
FIG. 2B is a schematic cross-sectional view showing an overall shape regarding another example of the cubic lattice part of the joint member shown in FIG. 1.

FIG. 2B is a schematic cross-sectional view showing an overall shape regarding another example of the cubic lattice part of the joint member shown in FIG. 1.

Figure 2C:
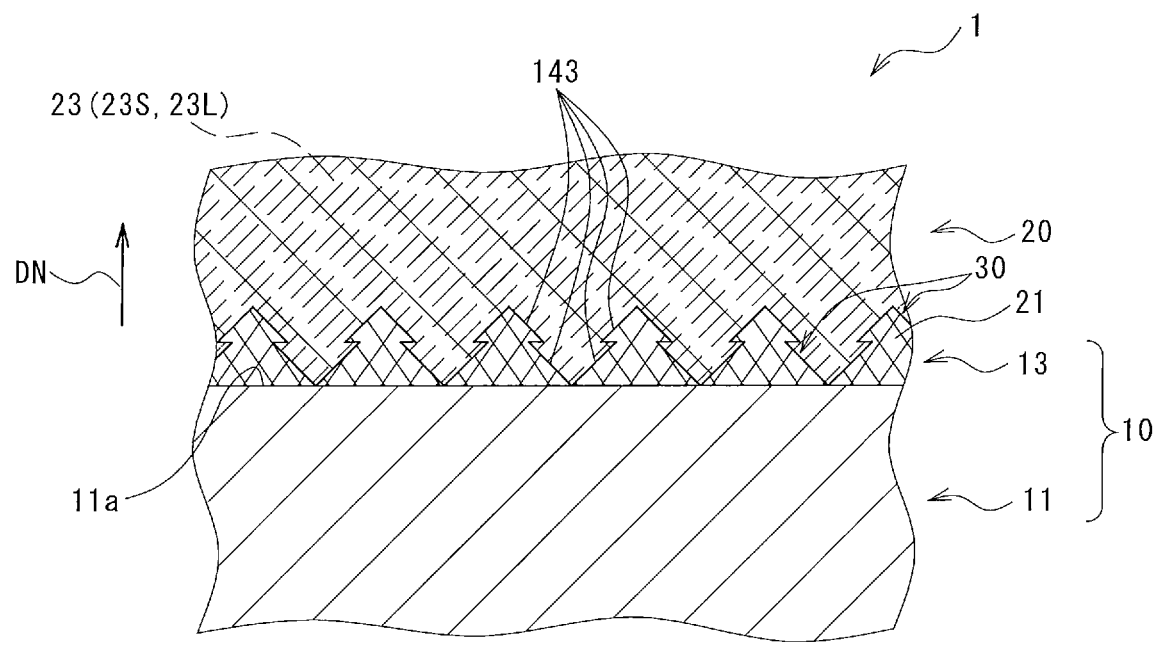
FIG. 2C is a schematic cross-sectional view showing an overall shape regarding still another example of the cubic lattice part of the joint member shown in FIG. 1.

FIG. 2C is a schematic cross-sectional view showing an overall shape regarding still another example of the cubic lattice part of the joint member shown in FIG. 1.

Figure 3A:
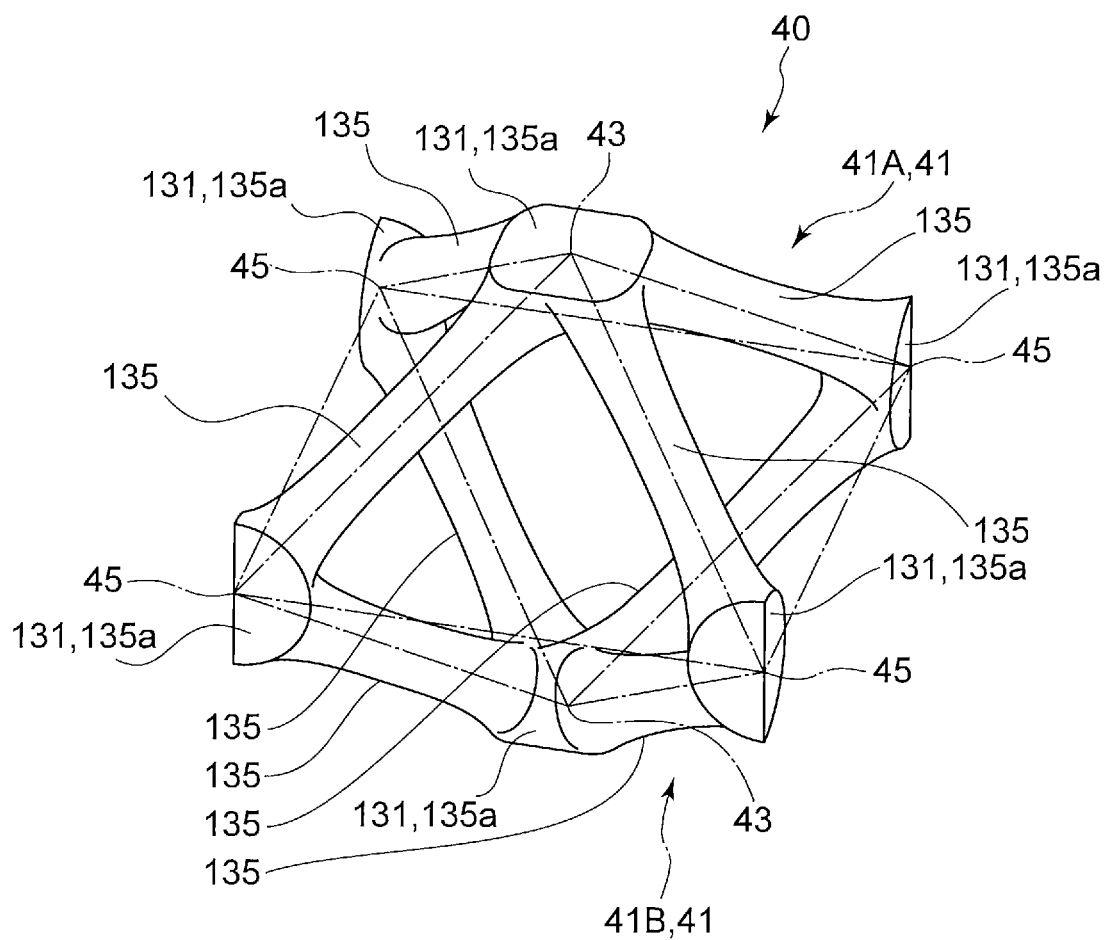
FIG. 3A is a perspective view showing an example of a unit lattice constituting the cubic lattice part.

FIG. 3A is a perspective view showing an example of a unit lattice constituting the cubic lattice part.

Figure 3B:
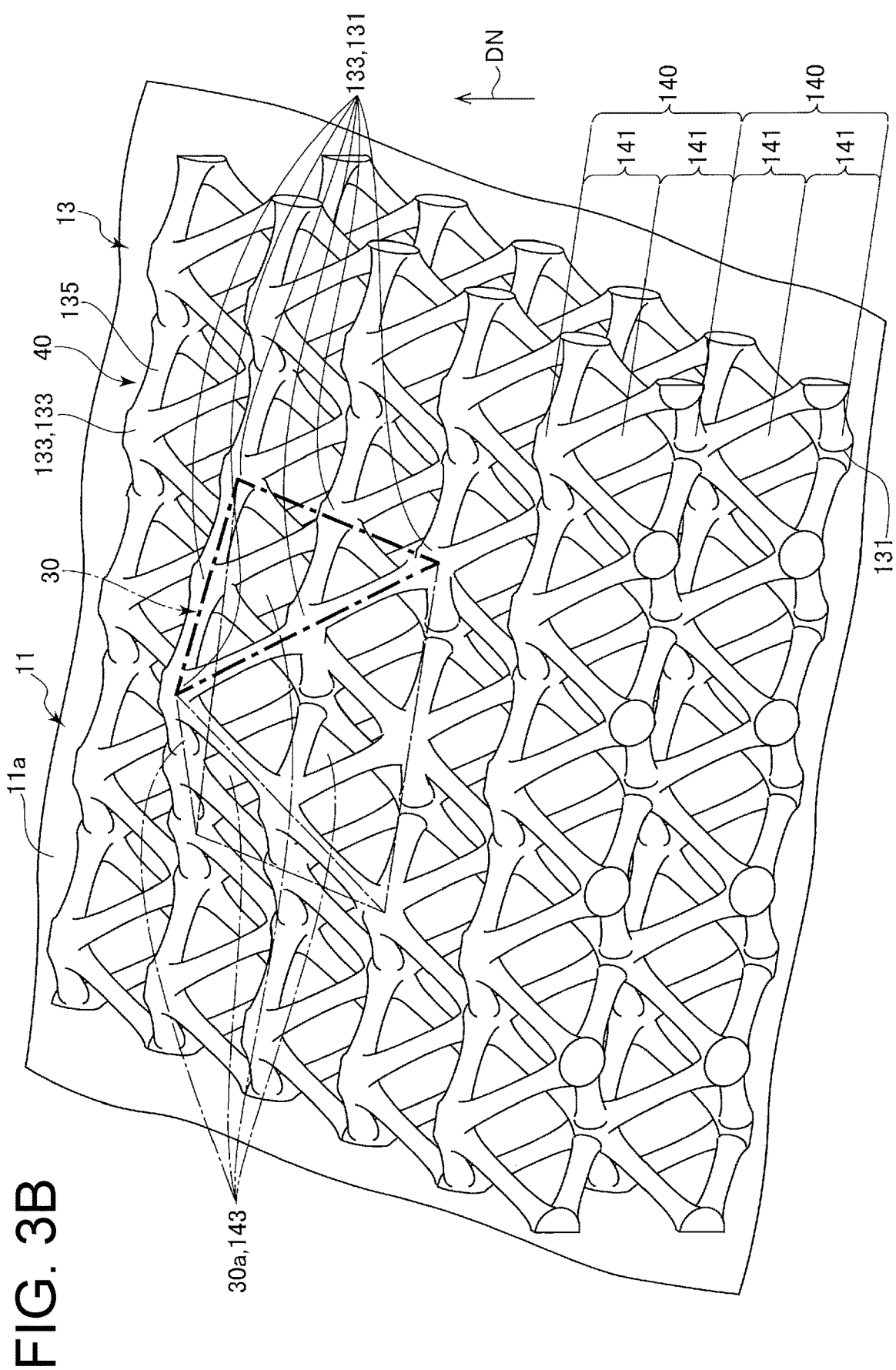
FIG. 3B is a perspective view showing an example of the cubic lattice part.

FIG. 3B is a perspective view showing an example of the cubic lattice part.

FIG. 3C is a schematic view for describing a protruding part (pyramid part).

(Joint Member 1)

A joint member 1 according to some embodiments shown in FIG. 1 is a joint member obtained by joining a metal member 10 and a resin member 20. That is, the joint member 1 according to some embodiments shown in FIG. 1 is a composite of a metal and a resin.

The metal member 10 according to some embodiments shown in FIG. 1 includes a base material 11, and a cubic lattice part 13 formed on a surface 11a of the base material 11 and embedded with the resin member 20.

In some embodiments, the cubic lattice part 13 has a three-dimensional structure in which a cavity is internally formed. More specifically, in some embodiments, for example, as shown in FIG. 3B, the cubic lattice part 13 includes a plurality of lattice points 131 and a plurality of arms 135 connecting the lattice points 131, respectively.

In some embodiments, the cavity inside the cubic lattice part 13 is filled with a resin 21 of the resin member 20.

In some embodiments, the resin member 20 preferably includes a fiber 23 entering into a range where an inclined surface 143 to be described later exists in a normal direction DN of the surface 11a of the base material 11.

Thus, with the fiber 23 entering into the range where the above-described inclined surface 143 exists in the normal direction DN of the surface 11a of the base material 11, it is possible to improve the strength of the resin 21 embedding the cubic lattice part 13, and to improve a joint strength of the joint member 1.

In FIGS. 2A to 2C, a length and extending direction of each line segment drawn to indicate the existence of the fiber 23, and the density of the line segments are irrelevant to the actual length and extending direction of the fiber 23, and the actual density of the fibers 23 in the resin 21.

In some embodiments, the length of the above-described fiber 23 may be not less than 0.5 times and not greater than 10 times of the length of each of the arms 135. In the following description, the fiber 23 having the length of not less than 0.5 times and not greater than 10 times of the length of the arm 135 will also be referred to as a short fiber 23S.

Thus, since the short fiber 23S can easily enter into even the cavity inside the cubic lattice part 13, it is possible to improve the strength of the resin 21 embedding the cubic lattice part 13, and to improve the joint strength of the joint member 1.

In the following description, the fiber 23 having the length of not less than 10 times of the length of the arm 135 will also be referred to as a long fiber 23L.

In some embodiments, the above-described fiber 23 may have a length which is not less than 10 times of the length of the arm 135, and may extend in a direction crossing the above-described normal direction DN in the range where the above-described inclined surface 143 exists in the above-described normal direction DN. More specifically, the extending direction of the long fiber 23L may have relatively large deviation from the normal direction DN, that is, may relatively be close to an extending direction of the surface 11a of the base material 11.

Thus, it is possible to improve the strength of the joint member 1 against an external force where a tension stress acts on the resin member 20 along the extending direction of the long fiber 23L.

The long fiber 23L may be, for example, a continuous fiber wound around the outer periphery of the metal member 10.

(Cubic Lattice Part 13)

In some embodiments, the cubic lattice part 13 preferably has a structure in which a unit lattice 40 or a unit structure 41 formed by the plurality of arms 135 repeatedly appears.

In some embodiments, the unit lattice 40 preferably has, for example, a polyhedron shape with the plurality of lattice points 131 as vertexes, respectively, and preferably has a cubic lattice shape where the number of sides in respective faces in the polyhedron is equal In some embodiments, the unit structure 41 preferably has a shape obtained by dividing the above-described unit lattice 40 into at least two on a surface including the plurality of lattice points 131.

For example, as shown in FIG. 3A, the unit lattice 40 may have, for example, a regular octahedral shape. The unit lattice 40 shown in FIG. 3A has a shape obtained by superimposing respective bottom surfaces of two quadrangular pyramids 41A, 41B each serving as the unit structure 41. In each of the quadrangular pyramids 41A, 41B, the arms 135 are, respectively, disposed at positions each corresponding to a line segment connecting a vertex 43 and a corresponding one of angles 45 of the bottom surface, that is, an oblique side. Each angle 45 of the vertex 43 and the bottom surface of the quadrangular pyramid 41A, 41B corresponds to a corresponding one of the lattice points 131.

In the case of the cubic lattice part 13 having the unit lattice 40 (unit structure 41) as shown in FIG. 3A, in additive manufacturing, if the orientation of the base material 11 is set such that the arms 135 extend in a direction crossing the horizontal direction, it is possible to model the arms 135 without providing a support for the arms 135 in an additive manufacturing method of, for example, powder bed fusion or metal deposition.

In some embodiments, each of the plurality of arms 135 may have a thickness of, for example, not less than 0.1 mm and not greater than 10 mm. Moreover, in some embodiments, the length of each of the plurality of arms 135 may be, for example, not less than 1 time and not greater than 10 times of the thickness of the arm.

(Protruding Part 30)

As shown in FIGS. 2A to 2C, the cubic lattice part 13 according to some embodiments includes a protruding part 30 protruding in a direction separating from the surface 11a of the base material 11, as the cubic lattice part 13 is viewed as a whole. The cubic lattice part 13 according to some embodiments preferably includes a plurality of protruding parts 30. Each of the protruding parts 30 preferably includes at least one unit structure 41 (the quadrangular pyramid 41A or the quadrangular pyramid 41B) described above in the unit lattice 40.

For instance, in an example shown in FIG. 3B, the protruding part 30 has a quadrangular pyramid shape as viewed as a whole. FIG. 3C is a view schematically representing the quadrangular pyramid shape according to the protruding part 30 shown in FIG. 3B, and represents a state as viewed from the side of the quadrangular pyramid. FIG. 3B illustrates only one protruding part 30, in order to avoid complication of the drawing.

In the example shown in FIG. 3B, the protruding part 30 includes one unit lattice 40 having a vertex 30b of the quadrangular pyramid shape as one of the lattice points 131, and four unit structures 41 (quadrangular pyramids 41A) disposed to surround the unit lattice 40 from all around. In the following description, for instance, as in the example shown in FIG. 3B, the protruding part 30 having the quadrangular pyramid shape as viewed as a whole will also be referred to as the pyramid part 30. That is, the protruding part 30 may be the pyramid part 30 formed by the plurality of inclined surfaces 143.

For descriptive convenience, a connection part between the surface 11a of the base material 11 and an end portion 135a of the arm 135 will also be referred to as the lattice point 131. That is, in some embodiments, the lattice point 131 indicates the connection part where the end portion 135a of the arm 135 is connected to a member other than the said arm 135, for example, the end portion 135a of the other arm 135, the surface 11a of the base material 11, or the like.

In other words, in some embodiments, in the lattice point 131, the end portion 135a of at least one arm 135 exists.

As shown in FIGS. 2A to 2C, the cubic lattice part 13 according to some embodiments is formed into, for example, a cone shape such that the size of the protruding part 30 decreases with distance from the surface 11a of the base material 11. In the example shown in FIG. 3B, the protruding part 30 has the quadrangular pyramid shape. However, the protruding part 30 may have a polygonal pyramid shape other than the quadrangular pyramid shape, such as a triangular pyramid shape or a hexagonal pyramid shape.

The protruding parts 30 may directly be formed on the surface 11a of the base material 11 as shown in FIGS. 2B and 2C, or may be formed via not less than one layer 140 (see FIG. 3B) of the unit lattice 40 formed on the surface 11a of the base material 11 by the plurality of unit lattices 40. The protruding parts 30 may be formed via not less than one layer 141 of the unit structure 41 formed on the surface of the base material by the plurality of unit structures 41 as shown in FIG. 3B.

Moreover, for example, as shown in FIG. 2C, each of the protruding parts 30 may include a projection 33 projecting from a side surface of the protruding part 30 toward a direction crossing a protruding direction of the protruding part 30 (the direction separating from the surface 11a of the base material 11). In the protruding part 30 shown in FIG. 2C, the projection 33 acts as an anchor against the resin embedding the protruding part 30, improving the joint strength of the joint member 1.

(Arrangement of Protruding Parts 30)

Each of FIGS. 3D to 3G is a schematic view showing an example of arrangement of the respective protruding parts and is a view as the cubic lattice part is viewed from the side of the resin member. For descriptive convenience, in FIGS. 3D to 3G the protruding parts 30 are described as the pyramid parts 30, respectively.

Figure 3D:
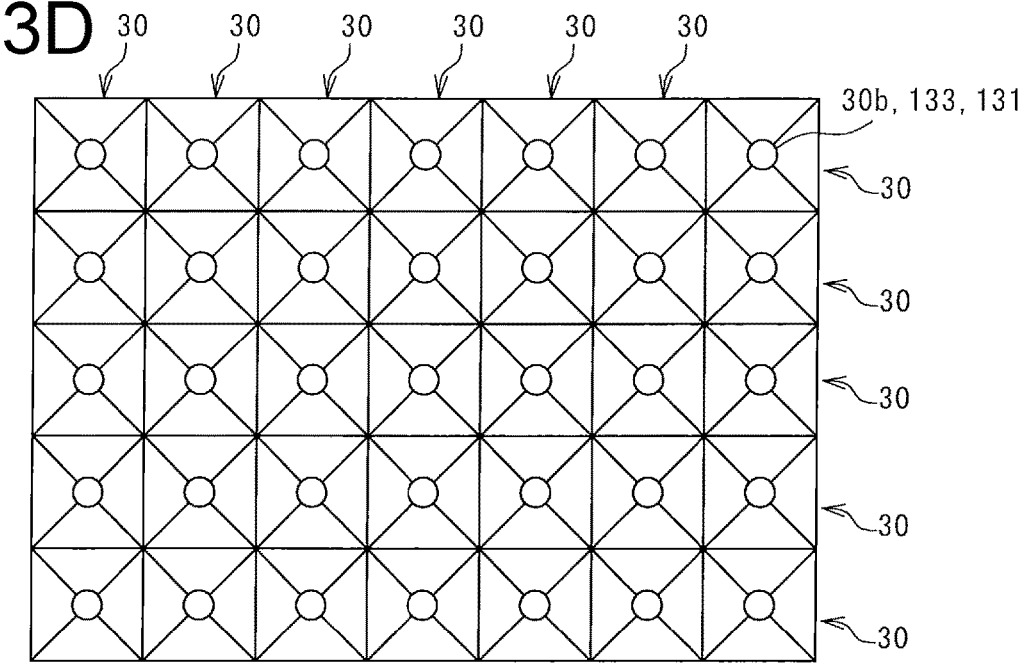
FIG. 3D is a schematic view showing an example of arrangement of respective protruding parts.
Figure 3E:
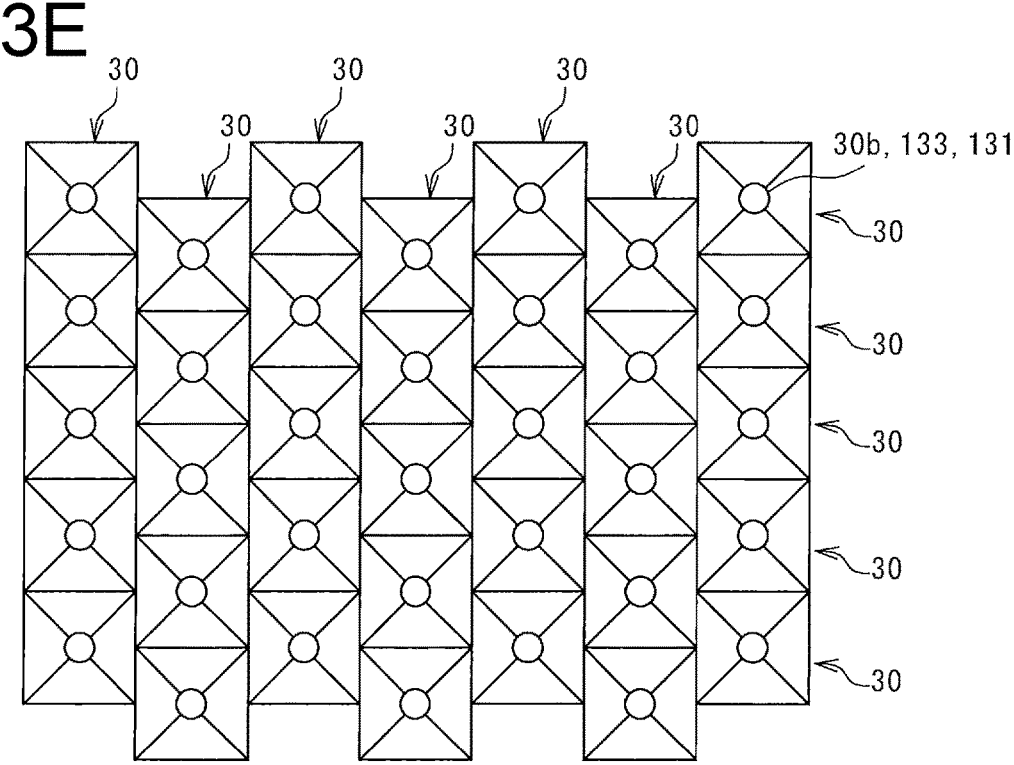
FIG. 3E is a schematic view showing an example of arrangement of the respective protruding parts.

As shown in FIGS. 3D and 3E, in some embodiments, the protruding parts 30 may be arranged adjacent to each other on the surface 11a of the base material 11. That is, in the examples shown in FIGS. 3D and 3E, the adjacent protruding parts 30 are arranged such that at least some of virtual sides defining virtual bottom surfaces of the pyramids overlap each other, respectively.

Figure 3F:
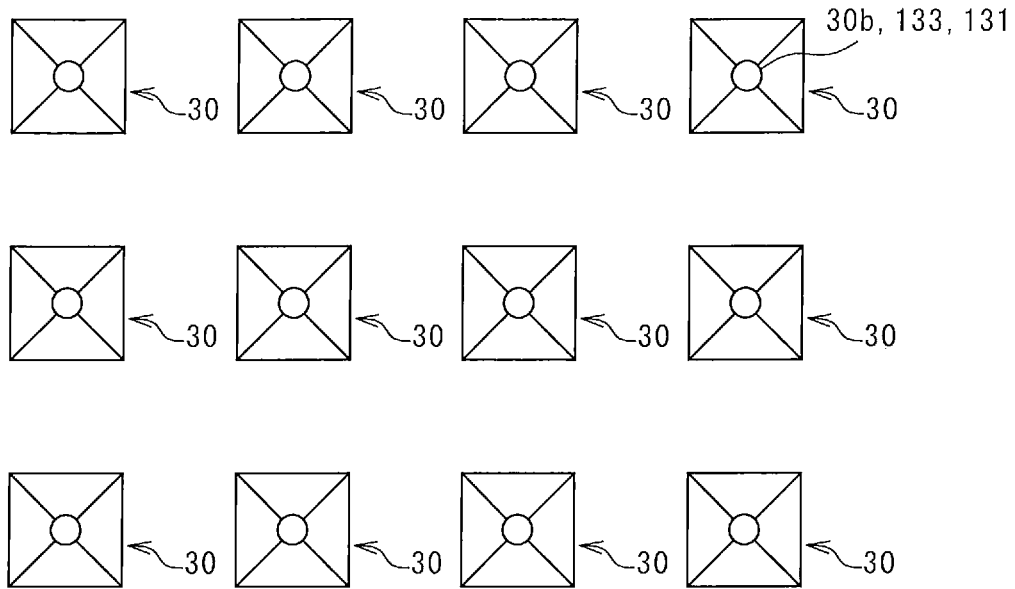
FIG. 3F is a schematic view showing an example of arrangement of the respective protruding parts.
Figure 3G:
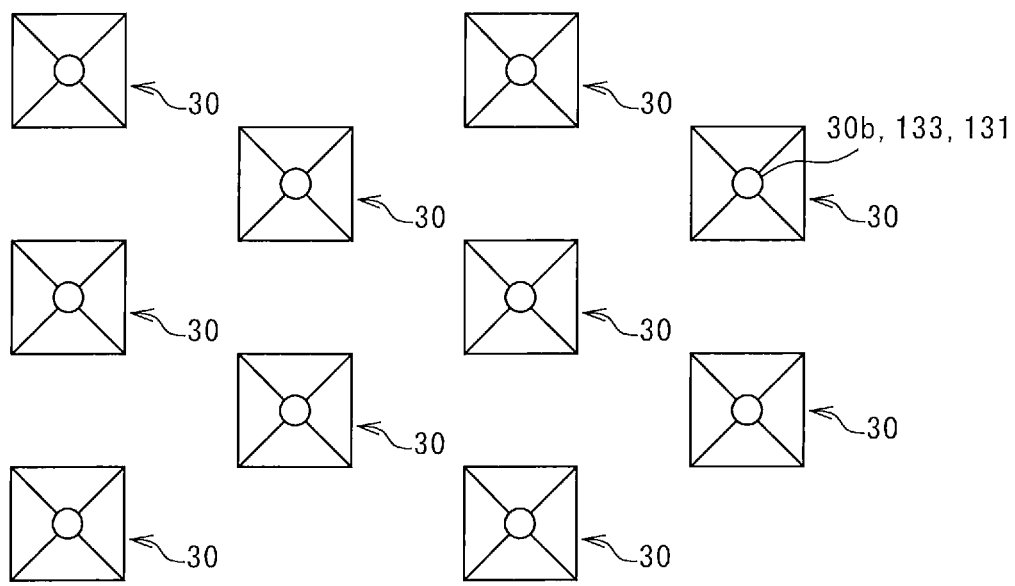
FIG. 3G is a schematic view showing an example of arrangement of the respective protruding parts.

Moreover, as shown in FIGS. 3F and 3G in some embodiments, the plurality of protruding parts 30 may be arranged to be spaced apart from each other on the surface 11a of the base material 11.

As shown in FIGS. 3D and 3F, in some embodiments, the plurality of protruding parts 30 may be arranged in a lattice pattern along an extending direction of the above-described virtual sides.

As shown in FIGS. 3E and 3G in some embodiments, the plurality of protruding parts 30 may be arranged in a staggered pattern.

(Outermost Lattice Point 133)

In the cubic lattice part 13 according to some embodiments described above, of the plurality of lattice points 131, an outermost lattice point 133 far from the surface 11a of the base material 11 includes at least three lattice points 131 forming the inclined surface 143 with respect to the above-described surface 11a. In the example shown in FIG. 3B, one inclined surface 143 of four inclined surfaces 143 included in the pyramid part 30 represented in FIG. 3B is indicated by a bold double-dotted chain line. In addition, in the example shown in FIG. 3B, the one inclined surface 143 includes six outermost lattice points 133.

If the unit lattice 40 has the regular octahedral shape as shown in FIG. 3A, a minimum configuration as the pyramid part 30 is one quadrangular pyramid 41A. Then, the minimum inclined surface 143 is the inclined surface 143 of the one quadrangular pyramid 41A and in this case, the inclined surface 143 includes three outermost lattice points 133.

The outermost lattice point 133 far from the surface 11a of the base material 11 is the lattice point 131 present on the surface of the cubic lattice part 13, as the cubic lattice part 13 is viewed from the side of the resin member 20.

Moreover, the inclined surface 143 is a virtual surface formed by the outermost lattice points 133. The inclined surface 143 is a virtual surface represented in appearance of the cubic lattice part 13, and is a virtual surface separating the inside and outside of the cubic lattice part 13. In other words, the outermost lattice point 133 is the lattice point 131 which defines the virtual surface corresponding to a boundary surface between the inside and outside of the cubic lattice part 13, as the cubic lattice part 13 is viewed from the outside (the side of the resin member 20).

For instance, in the example shown in FIG. 3B, a side surface 30a of the protruding part 30 having the quadrangular pyramid shape is the inclined surface 143.

For example, consider a case where the joint member 1 is pulled in a direction in which the metal member 10 and the resin member 20 are separated from each other.

In this case, the arm 135 of the plurality of arms 135 forming the cubic lattice part 13 present in a region close to the surface 11a of the base material 11 bears, in addition to a load acting on the arm 135 present in the said region, a load acting on the arm 135 present in a region far from the surface 11a of the base material 11 relative to the said region.

Likewise, the resin 21 of the resin 21 embedding the cubic lattice part 13 present in a region far from the surface 11a of the base material 11 of the metal member 10 bears, in addition to a load acting on the resin 21 present in the said region, a load acting on the resin 21 present in a region close to the surface 11a of the base material 11 of the metal member 10 relative to the said region.

Therefore, in the plurality of arms 135 forming the cubic lattice part 13, the burden of the load tends to increase toward the surface 11a of the base material 11. Moreover, in the resin 21 embedding the cubic lattice part 13, the burden of the load tends to increase with distance from the surface 11a of the base material 11 of the metal member 10.

Thus, if the proportion of the arm 135 per unit volume in the cubic lattice part 13 increases toward the surface 11a of the base material 11, it is possible to suppress an increase in stress of the arm 135. Moreover, in the resin 21 embedding the cubic lattice part 13, if the proportion of the resin 21 per unit volume increases with distance from the surface 11a of the base material 11, it is possible to suppress an increase in stress of the resin 21 embedding the cubic lattice part 13.

In the joint member 1 according to some embodiments described above, since the cubic lattice part 13 has the inclined surface 143 formed by the at least three outermost lattice points 133, the size of the cubic lattice part 13 gradually changes depending on the position in the normal direction DN of the surface 11a of the base material 11. Therefore, if the inclined surface 143 is formed such that the size of the cubic lattice part 13 gradually decreases with distance from the surface 11a of the base material 11, that is, the size of the cubic lattice part 13 gradually increases toward the surface 11a of the base material 11, the proportion of the arm 135 per unit volume gradually increases toward the surface 11a of the base material 11, and the proportion of the resin 21 per unit volume gradually increases with distance from the surface 11a of the base material 11.

Therefore, with the joint member 1 according to some embodiments, it is possible to suppress the increase in stress of the arm 135 and the increase in stress of the resin 21 embedding the cubic lattice part 13, making it possible to ensure the respective strengths of the cubic lattice part 13 and the resin 21 embedding the cubic lattice part 13, and to improve the joint strength of the joint member 1.

In addition, with the joint member 1 according to some embodiments, since the proportion of the arm 135 per unit volume and the proportion of the resin 21 per unit volume described above gradually change in accordance with the distance from the surface 11a of the base material 11, it is possible to mitigate a thermal stress caused by a difference in linear expansion coefficient between the base material 11 (metal member 10), and the resin 21 and the fiber 23 in the resin member 20.

For example, in a case where the resin member 20 is CFRP, and the fiber 23 is the above-described long fiber 23L or continuous fiber, since the fiber 23 is a carbon fiber, if the tensile strength of the fiber 23 is relatively high, and the difference in linear expansion coefficient from the metal member 10 is relatively large, the effect of mitigating the thermal stress described above is further enhanced.

The cubic lattice part 13 according to some embodiments described above includes the protruding part 30 having the inclined surfaces 143 described above.

Thus, the above-described proportion of the arm 135 per unit volume and proportion of the resin 21 per unit volume in the protruding part 30 gradually change in accordance with the distance from the surface 11a of the base material 11. Thus, it is possible to suppress the increase in stress of the arm 135 in the protruding part 30 and to suppress the increase in stress of the resin 21 present at the position where the position from the surface 11a of the base material 11 is the same as the protruding part 30, that is, the resin 21 embedding the protruding part 30, making it possible to ensure the respective strengths of the protruding part 30 and the resin 21 embedding the protruding part 30, and to improve the joint strength of the joint member 1.

In the cubic lattice part 13 according to some embodiments, the unit lattice 40 or the unit structure 41 preferably decreases in number with distance from the surface 11a of the base material 11. For example, as shown in FIGS. 2A to 2C, the cubic lattice part 13 according to some embodiments is preferably formed such that the size of the protruding part 30 decreases with distance from the surface 11a of the base material 11.

Thus, the proportion of the arm 135 per unit volume gradually increases toward the surface 11a of the base material 11, and the proportion of the resin 21 per unit volume gradually increases with distance from the surface 11a of the base material 11. Therefore, it is possible to suppress the increase in stress of the arm 135 and the increase in stress of the resin 21 embedding the cubic lattice part 13, making it possible to ensure the respective strengths of the cubic lattice part 13 and the resin 21 embedding the cubic lattice part 13, and to improve the joint strength of the joint member 1.

As described above, the cubic lattice part 13 according to some embodiments includes the plurality of pyramid parts (protruding parts) 30 formed by the plurality of inclined surfaces 143, respectively.

In each pyramid part 30, the proportion of the arm 135 per unit volume and the proportion of the resin 21 per unit volume described above gradually change in accordance with the distance from the surface 11a of the base material 11. Thus, it is possible to suppress the increase in stress of the arm 135 in the pyramid part 30 and to suppress the increase in stress of the resin 21 present at the position where the position from the surface 11a of the base material 11 is the same as the pyramid part 30, that is, the resin 21 embedding the pyramid part 30, making it possible to ensure the respective strengths of the pyramid part 30 and the resin 21 embedding the pyramid part 30, and to improve the joint strength of the joint member 1.

Other Embodiments of Cubic Lattice Part

Figure 4A:
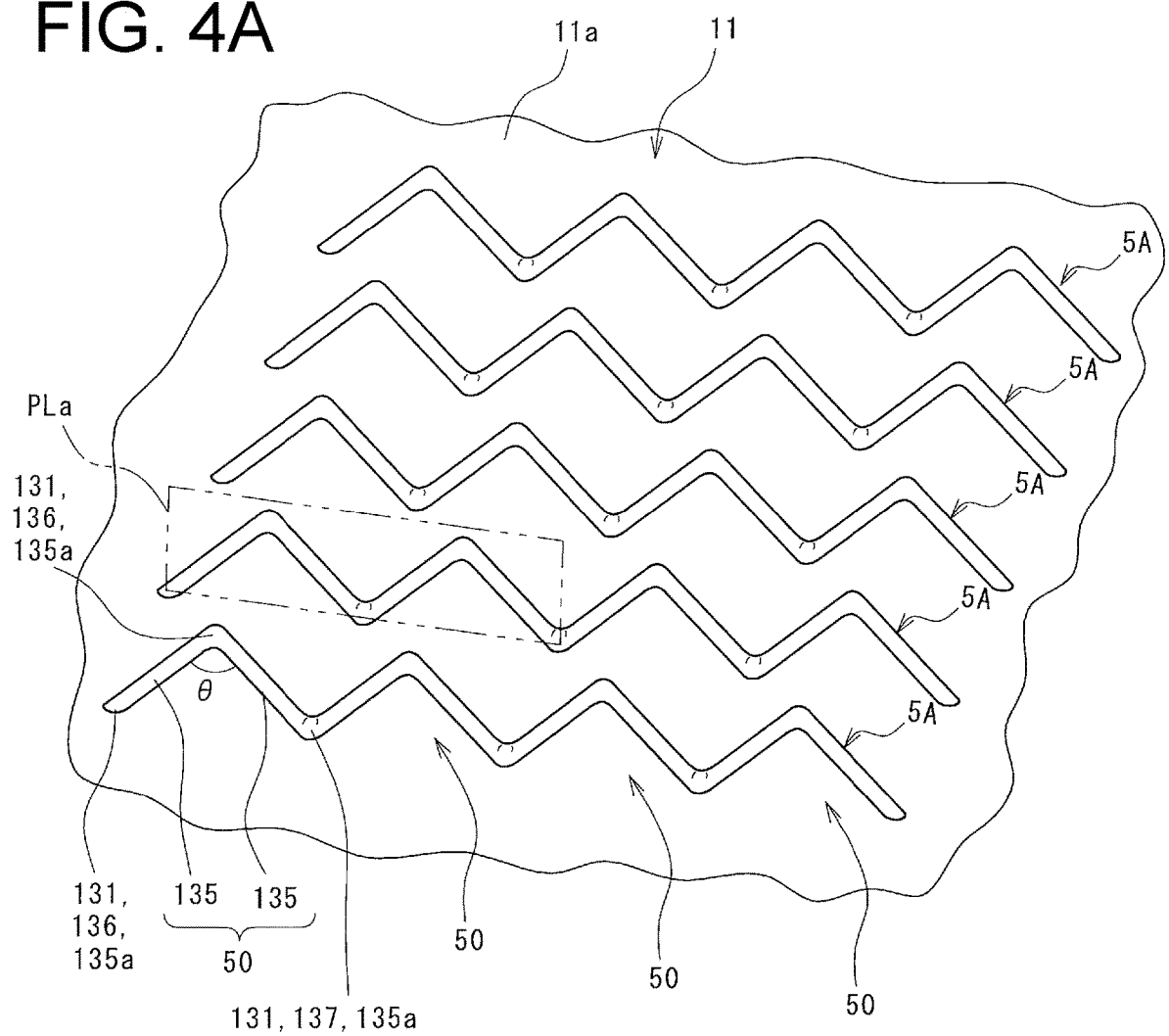
FIG. 4A is a perspective view showing a portion of the cubic lattice part according to another embodiment.
Figure 4A:
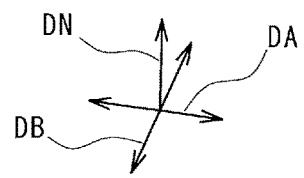

FIG. 4A is a perspective view showing a portion of the cubic lattice part according to another embodiment.

Figure 4B:
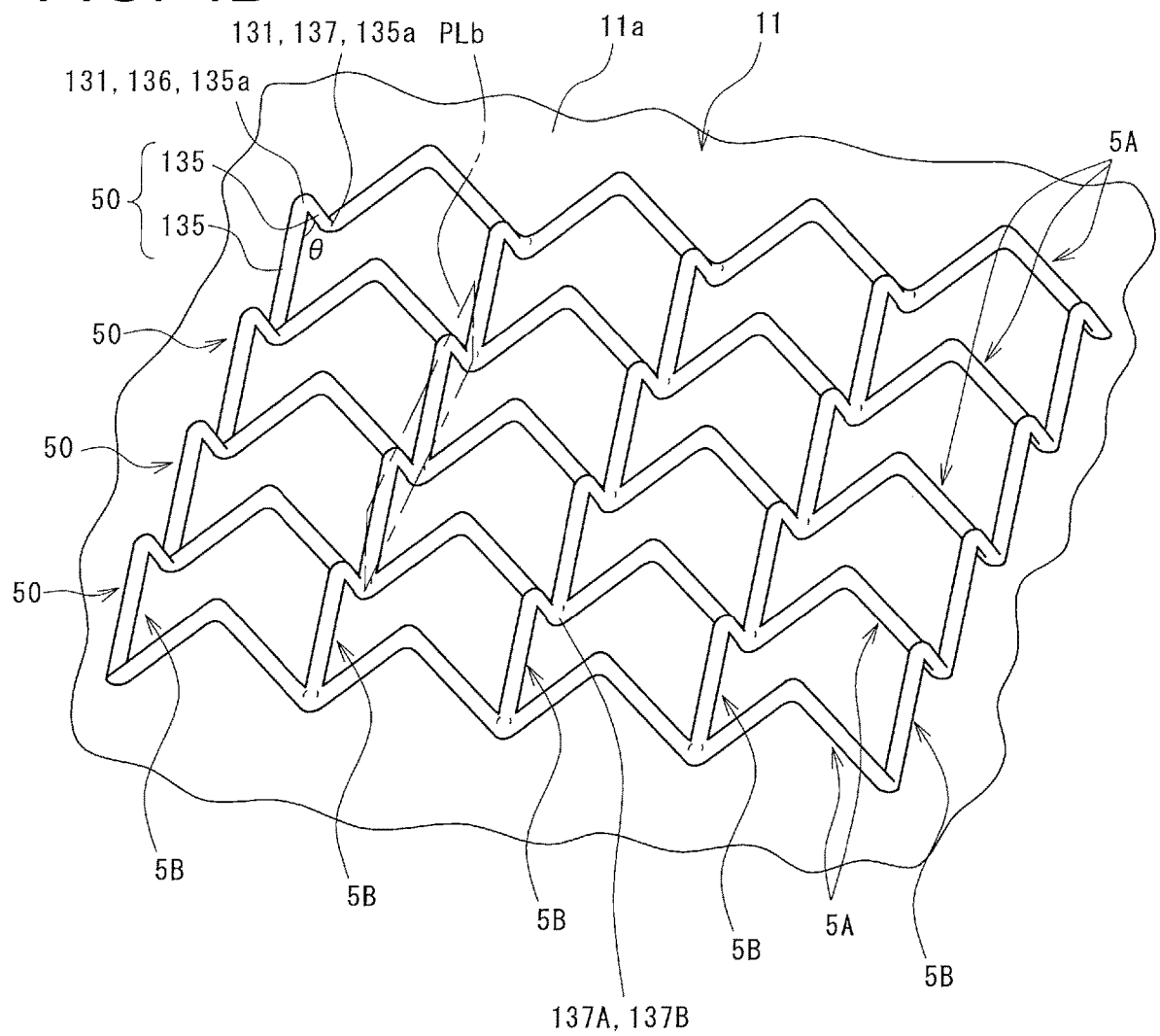
FIG. 4B is a perspective view showing a portion of the cubic lattice part according to still another embodiment.
Figure 4B:
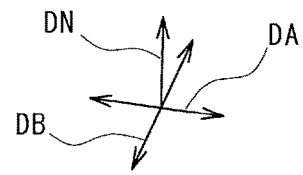

FIG. 4B is a perspective view showing a portion of the cubic lattice part according to still another embodiment.

FIG. 4C is a perspective view showing a portion of the cubic lattice part according to still another embodiment.

Figure 4D:
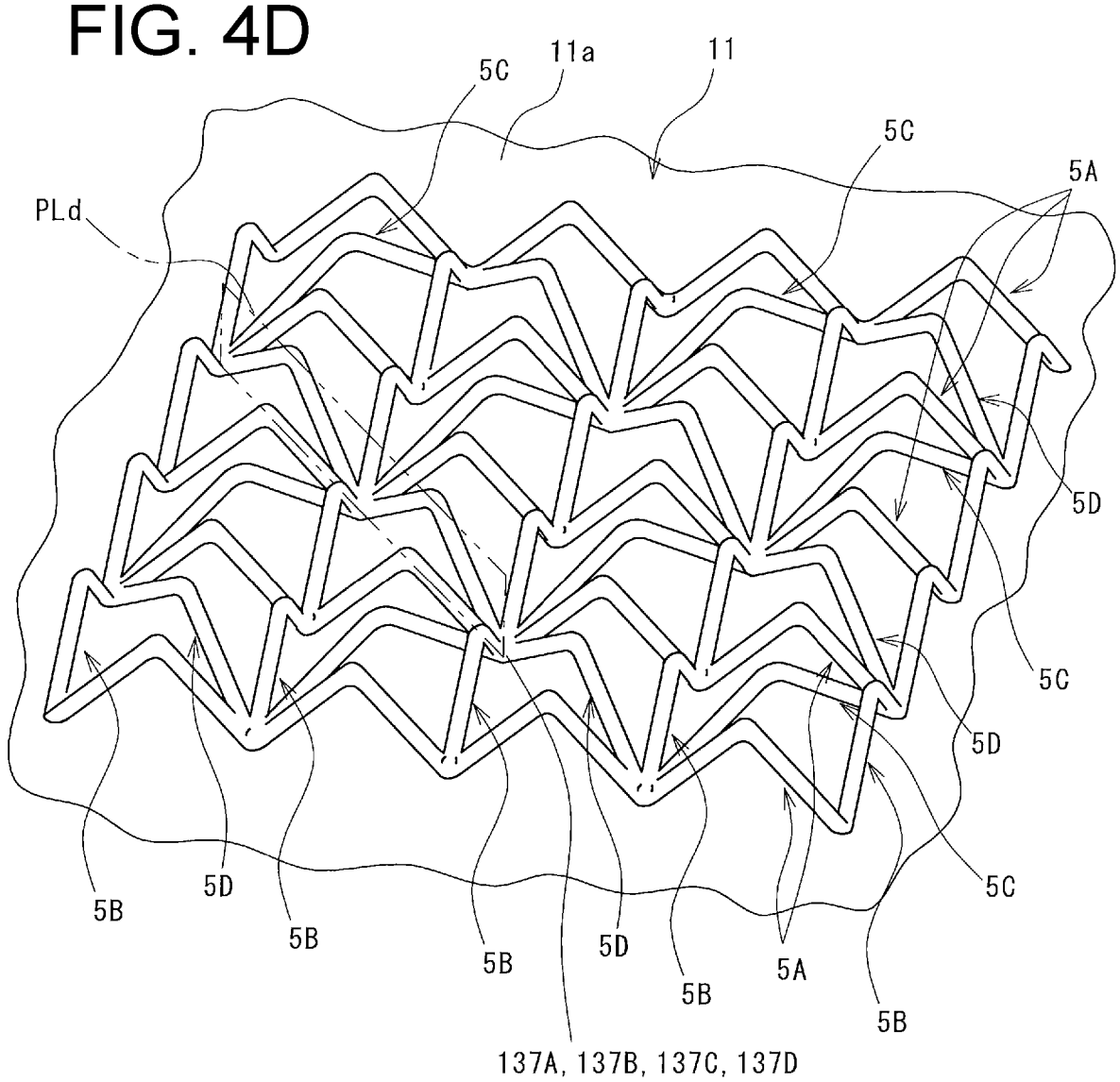
FIG. 4D is a perspective view showing a portion of the cubic lattice part according to still another embodiment.
Figure 4D:
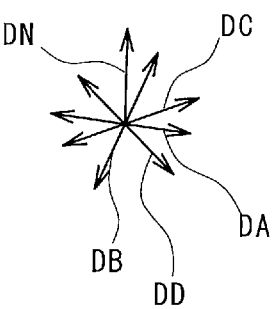

FIG. 4D is a perspective view showing a portion of the cubic lattice part according to still another embodiment.

The cubic lattice part 13 shown in FIGS. 4A to 4D includes the plurality of lattice points 131, and the plurality of arms 135 connecting the plurality of lattice points 131 and the surface 11a of the base material 11. The plurality of lattice points 131 are each a connection point of respective tip ends 136 of two arms 135 extending toward the lattice point 131 from the side of the base material 11.

The cubic lattice part 13 shown in FIGS. 4A to 4D includes a plurality of unit members 50. In the cubic lattice part 13 shown in FIGS. 4A to 4D, each of the plurality of unit members 50 includes metallic two arms 135. The two arms 135, respectively, have the end portions 135a (tip ends 136) on one side connected to each other and have the end portions 135a (base ends 137) on another side separated from each other, and an angle θ of the two arms 135 is less than 180 degrees. Each of the plurality of unit members 50 is a pair of two arms 135.

The cubic lattice part 13 shown in FIG. 4A includes a plurality of rows 5A of the continuous unit members 50 obtained by connecting the plurality of unit members 50 to each other at the base ends 137 of the arms 135, respectively. In the cubic lattice part 13 shown in FIG. 4A, the plurality of rows 5A are arranged at intervals in a direction (second extending direction) DB orthogonal to an extending direction (first extending direction) DA of the rows 5A.

In the cubic lattice part 13 shown in FIG. 4A, in each of the plurality of rows 5A, the arms 135 of each unit member 50 included in the row 5A exist in a virtual plane PLa. The virtual plane PLa may exist in each of the plurality of rows 5A, and the plurality of virtual planes PLa may be parallel to each other.

As shown in FIG. 4B, in addition to the plurality of rows 5A in the cubic lattice part 13 shown in FIG. 4A, the cubic lattice part 13 may include a plurality of rows 5B of the continuous unit members 50 obtained by connecting the plurality of unit members 50 to each other at the base ends 137 of the arms 135, respectively. In the cubic lattice part 13 shown in FIG. 4B, the plurality of rows 5B extend in the direction DB orthogonal to the extending direction DA of the rows 5A. In the cubic lattice part 13 shown in FIG. 4B, the plurality of rows 5B are arranged at intervals in the extending direction DA of the rows 5A. In the cubic lattice part 13 shown in FIG. 4B, each unit member 50 in each of the plurality of rows 5B includes the arms 135 each having a base end 137B connected to a base end 137A of a corresponding one of the arms 135 of each unit member 50 in each of the plurality of rows 5A.

In the cubic lattice part 13 shown in FIG. 4B, in each of the plurality of rows 5B, the arms 135 of each unit member 50 included in the row 5B exist in a virtual plane PLb. The virtual plane PLb may exist in each of the plurality of rows 5B, and the plurality of virtual planes PLb may be parallel to each other.

As shown in FIG. 4C, in addition to the plurality of rows 5A and rows 5B in the cubic lattice part 13 shown in FIG. 4B, the cubic lattice part 13 may include a plurality of rows 5C of the continuous unit members 50 obtained by connecting the plurality of unit members 50 to each other at the base ends 137 of the arms 135, respectively.

Viewing the cubic lattice part 13 shown in FIG. 4C from the normal direction DN of the surface 11a of the base material 11, a rectangular region 11b exists which is surrounded by two unit members 50 (the unit members 50 of the rows 5A) adjacent to each other along the second extending direction DB and two unit members 50 of the rows 5B connected to the arms 135 of the two unit members 50 of the rows 5A at the base ends 137, respectively. In the cubic lattice part 13 shown in FIG. 4C, the rows 5C of the unit members 50 exist in a same direction DC as one of diagonal lines of the rectangular region 11b. In the cubic lattice part 13 shown in FIG. 4C, each unit member 50 in each of the plurality of rows 5C includes the arms 135 each having a base end 137C connected to the base end 137A of the corresponding one of the arms 135 of each unit member 50 in each of the plurality of rows 5A and the base end 137B of a corresponding one of the arms 135 of each unit member 50 in each of the plurality of rows 5B.

In the cubic lattice part 13 shown in FIG. 4C, in each of the plurality of rows 5C, the arms 135 of each unit member 50 included in the row 5C exist in a virtual plane PLc. The virtual plane PLc may exist in each of the plurality of rows 5C, and the plurality of virtual planes PLc may be parallel to each other.

Moreover, as shown in FIG. 4D, the cubic lattice part 13 may include a plurality of rows 5D of the unit members 50 extending in a same direction DD as the other of the diagonal lines of the rectangular region 11b shown in FIG. 4C, by thinning out, every one row, the rows 5C in the cubic lattice part 13 shown in FIG. 4C. Each of the rows 5D of the unit members 50 shown in FIG. 4D is a continuous row obtained by connecting the plurality of unit members 50 to each other at the base ends 137 of the arms 135, respectively. In the cubic lattice part 13 shown in FIG. 4D, each unit member 50 in each of the plurality of rows 5D includes the arms 135 each having a base end 137D connected to the base end 137A of the corresponding one of the arms 135 of each unit member 50 in each of the plurality of rows 5A, the base end 137B of the corresponding one of the arms 135 of each unit member 50 in each of the plurality of rows 5B, and the base end 137C of a corresponding one of the arms 135 of each unit member 50 in each of the plurality of rows 5C.

In the cubic lattice part 13 shown in FIG. 4D, in each of the plurality of rows 5D, the arms 135 of each unit member 50 included in the row 5D exist in a virtual plane PLd. The virtual plane PLd may exist in each of the plurality of rows 5D, and the plurality of virtual planes PLd may be parallel to each other.

For example, a joint member obtained by joining a metal material and a resin material can be used for various purposes as a material combining the characteristics of a metal and the characteristics of a resin. In such a joint member of the metal material and the resin material, it is necessary to join different kinds of materials of the metal and the resin at a sufficient joint strength.

However, a bonding strength at a joint interface between the metal and the resin may be decreased by, for example, occurrence of metal oxidation or the like due to an influence of moisture present at the joint interface.

Thus, in order to ensure the joint strength between the metal material and the resin material without depending on the bonding strength at the joint interface between the metal and the resin, considered is joining the resin material and the metal material by causing the resin material and the metal material to each have a parallel cross structure to be incorporated into respective gaps (for example, see WO2017/082207A as Patent Document).

In the joint member described in the above-described Patent Document, applying non-electrolytic plating and electrolytic plating to the parallel cross structural object by the resin, the parallel cross structural object by the metal material is formed in the gap of the parallel cross structural object by the resin.

However, in the joint member described in the above-described Patent Document, even if an intention is made to further form, with electrolytic plating, a portion formed by the metal material with respect to the parallel cross structural object by the metal material, it is difficult to form a large portion exceeding several tens of millimeter, for example. Moreover, if a separately formed metallic member is joined to the parallel cross structural object by the metal material, since the parallel cross structural object by the resin material is incorporated into the gap of the parallel cross structural object by the metal material described above, it is difficult to perform the joining by welding. Thus, the parallel cross structural object and the metallic member have to be joined by a joint method other than welding, such as coupling by a screw, which may cause inconvenience, such as the structure of the joint part is complicated or a sufficient joint strength is hardly obtained.

In the cubic lattice part 13 shown in FIGS. 4A to 4D, two arms 135 extending from the side of the base material 11 toward the same lattice point 131 extend at different angles. Thus, if a force to causing separation or misalignment of the resin member 20 and the metal member 10 is applied to the joint member 1, in the cubic lattice part 13 and the region of the resin member 20 embedding the cubic lattice part 13, the force is applied in a direction different from an extending direction of at least one arm 135 of the above-described two arms 135. Thus, a phenomenon, in which the arm 135 falls out of the resin 21 in the extending direction of the arm 135, hardly occurs, making it possible to ensure the joint strength of the cubic lattice part 13 and the resin 21 embedding the cubic lattice part 13, and to improve the joint strength of the joint member 1.

In the cubic lattice part 13 shown in FIGS. 4A to 4D, the cubic lattice part 13 includes at least two pairs of unit members 50 each of which is a pair of two arms 135 described above. The one arm 135 in one pair (unit member 50) of the above-described two pairs (two unit members 50) of arms 135 has the base end 137 connected to the base end 137 of one arm 135 in another pair (unit member 50) of the above-described two pairs (two unit members 50) of arms 135.

Thus, with the cubic lattice part 13 where not less than two pairs of the pair (unit member 50) of arms 135 are continuously formed, it is possible to ensure the joint strength of the cubic lattice part 13 and the resin 21 embedding the cubic lattice part 13, and to improve the joint strength of the joint member 1.

In the cubic lattice part 13 shown in FIGS. 4A to 4D, in the row 5A to the row 5D, the two arms 135 in the one pair (unit member 50) of the above-described two pairs (two unit members 50) and the two arms 135 in the another pair (unit member 50) are included in the same planes (the plane PLa to the plane PLd), respectively.

Thus, it is possible to increase the size of the cubic lattice part 13 along the above-described planes (the plane PLa to the plane PLd).

Consider a case where, in the cubic lattice part 13 shown in FIGS. 4B to 4D, the one pair (unit member 50) of the above-described two pairs (two unit members 50) of arms 135 is included in the row 5A, and the another pair (unit member 50) is included in any of the rows 5B to the row 5D, other than the row 5A. In this case, the plane (for example, the above-described plane PLa) where the two arms 135 in the one pair (unit member 50) are included and a plane (for example, any of the above-described plane PLb to plane PLd) where the two arms 135 in the another pair (unit member 50) are included cross each other.

In this case, it is possible to increase the size of the cubic lattice part 13 along the surface 11a of the base material 11.

In the cubic lattice part 13 shown in FIGS. 4A to 4D, a distance between the surface 11a of the base material 11 and the lattice point 131 where the two arms 135 in the one pair (unit member 50) of the above-described two pairs (two unit members 50) of arms 135 are connected (a connection point of the respective tip ends 136 of the two arms 135) may be equal to a distance between the surface 11a of the base material 11 and the lattice point 131 where the two arms 135 in the another pair (unit member 50) are connected (a connection point of the respective tip ends 136 of the two arms 135).

That is, in the cubic lattice part 13 shown in FIGS. 4A to 4D, the height of the connection point of the respective tip ends 136 of the two arms 135 from the surface 11a of the base material 11 may be equal in any of the unit members 50.

Thus, it is possible to form the cubic lattice part 13 including the plurality of lattice points 131 which are equal in distance from the surface 11a of the base material 11.

In the cubic lattice part 13 shown in FIGS. 4A to 4D, the distance between the surface 11a of the base material 11 and the lattice point 131 where the two arms 135 in the one pair (unit member 50) of the above-described two pairs (two unit members 50) of arms 135 are connected (the connection point of the respective tip ends 136 of the two arms 135) may be different from the distance between the surface 11a of the base material 11 and the lattice point 131 where the two arms 135 in the another pair (unit member 50) are connected (the connection point of the respective tip ends 136 of the two arms 135).

That is, in the cubic lattice part 13 shown in FIGS. 4A to 4D, there may be the unit member 50 which is different from the other unit members 50 in height of the connection point of the respective tip ends 136 of the two arms 135 from the surface 11a of the base material 11.

Thus, it is possible to form the cubic lattice part 13 including the lattice point 131 which is different from the other lattice points 131 in distance from the surface 11a of the base material 11.

(Cubic Lattice Member 6)

In some embodiments described above, the cubic lattice part 13 is formed on the surface 11a of the base material 11 and is integrated with the base material 11. In order to integrate the cubic lattice part 13 with the base material 11, for example, a three-dimensional additive manufacturing device may be used to integrally model the cubic lattice part 13 and the base material 11 by various additive manufacturing methods.

Alternatively, the cubic lattice part 13 according to some embodiments described above may be formed separately from the base material 11. Hereinafter, the cubic lattice part 13 formed separately from the base material 11 will also be referred to as a cubic lattice member 6.

Figure 5:
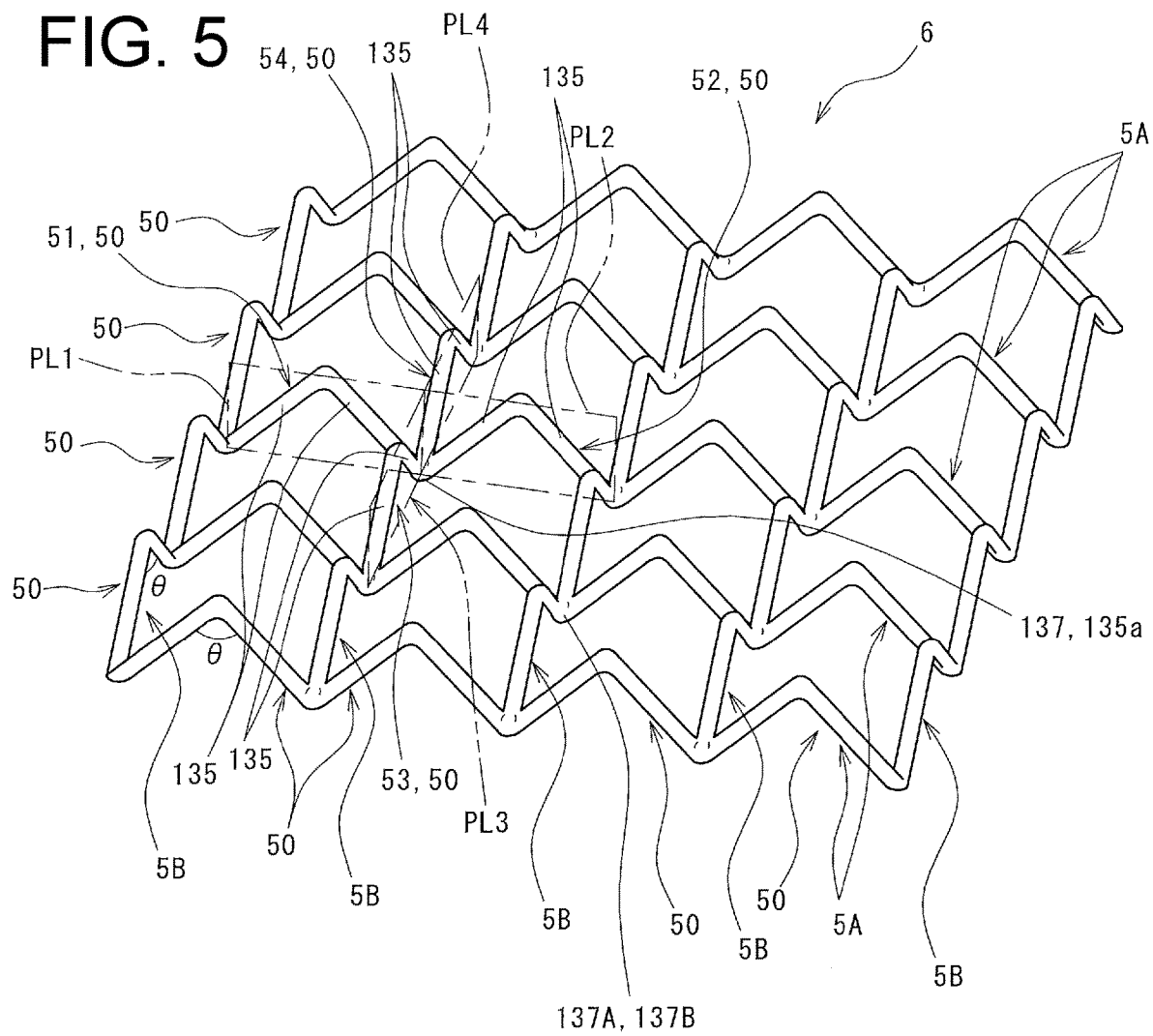
FIG. 5 is a perspective view showing an example of a cubic lattice member.
Figure 5:
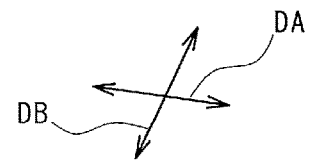

FIG. 5 is a perspective view showing an example of the cubic lattice member 6, and represents the cubic lattice part 13 of FIG. 4B formed separately from the base material 11. The cubic lattice member 6 according to some embodiments may have a form as any of the above-described cubic lattice parts 13, without being limited to a form as the cubic lattice part 13 shown in FIG. 4B.

Figure 6A:
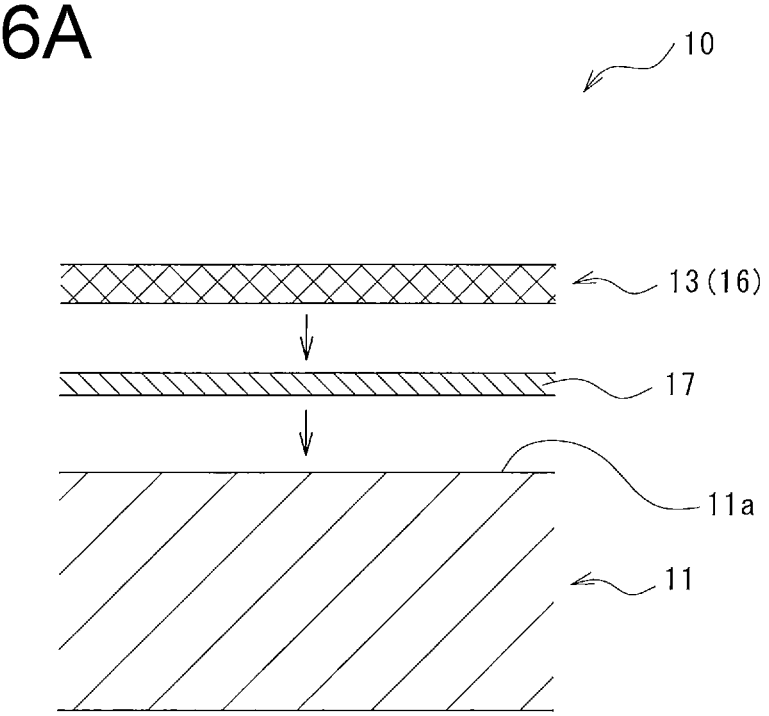
FIG. 6A is a schematic view for describing a method for integrating the cubic lattice part formed separately from a base material with the base material.

FIG. 6A is a schematic view for describing a method for integrating the cubic lattice part 13 (cubic lattice member 6) formed separately from the base material 11 with the base material 11. For example, in the metal member 10 according to some embodiments, the cubic lattice part 13 (cubic lattice member 6) may be brazed to the base material 11. For example, as shown in FIG. 6A, a sheet-shaped brazing material 17 is disposed between the surface 11a of the base material 11 and the cubic lattice part 13 (cubic lattice member 6), and the brazing material 17 is melted and then solidified, making it possible to braze the cubic lattice part 13 (cubic lattice member 6) to the surface 11a of the base material 11.

Thus, it is also possible to braze the cubic lattice part 13 formed by, for example, the three-dimensional additive manufacturing device to the relatively large base material 11 which is formed by, for example, casting or machining and cannot be formed by the three-dimensional additive manufacturing device. Thus, it is possible to hardly be restricted by the size of the metal member 10.

For example, even if restricted by the size of the cubic lattice part 13 (cubic lattice member 6) due to formation by the three-dimensional additive manufacturing device, it is possible to obtain the relatively large metal member 10 by brazing the plurality of cubic lattice parts 13 (cubic lattice members 6) to the base material 11 as described above.

Figure 6B:
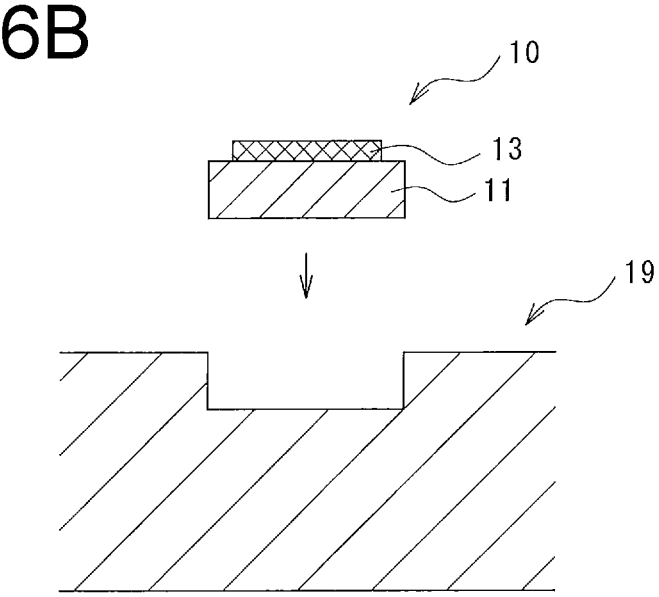
FIG. 6B is a view schematically showing a state in which a metal member including the cubic lattice part and a metallic base are joined.

Moreover, when a relatively large product is produced, the following may be applied. FIG. 6B is a view schematically showing a state in which the metal member 10 including the cubic lattice part 13 and a metallic base 19 are joined. As shown in FIG. 6B, the relatively large product may be obtained by joining the metal member 10 including the cubic lattice part 13 to the metallic base 19 by, for example, welding. That is, in some embodiments, the joint member 1 may further include the metallic base 19 joined to the base material 11 where the cubic lattice part 13 is formed.

Thus, it is also possible to join the metal member 10 formed by, for example, the three-dimensional additive manufacturing device to the relatively large base 19 which is formed by, for example, casting or machining and cannot be formed by the three-dimensional additive manufacturing device. Thus, it is possible to hardly be restricted by the size of the base 19.

Supplementary explanation of the cubic lattice member 6 shown in FIG. 5 will be given.

For example, the cubic lattice member 6 shown in FIG. 5 at least includes, as the unit members 50, a first unit member 51, a second unit member 52, a third unit member 53, and a fourth unit member 54, respectively.

For example, the first unit member 51 and the second unit member 52 are two adjacent unit members 50 included in the same row 5A. Moreover, the third unit member 53 and the fourth unit member 54 are two adjacent unit members 50 included in the same row 5B.

The first unit member 51, the second unit member 52, the third unit member 53, and the fourth unit member 54 are preferably connected to each other in the end portion 135a (base end 137) on the another side of one of the two arms 135 in each of the first unit member 51, the second unit member 52, the third unit member 53, and the fourth unit member 54. A first plane PL1 where the two arms 135 in the first unit member 51 are included is the same as a second plane PL2 where the two arms 135 in the second unit member 52 are included. It is preferable that a third plane PL3 where the two arms 135 in the third unit member 53 are included is the same as a fourth plane PL4 where the two arms 135 in the fourth unit member 54 are included, and is different from the first plane PL1 and the second plane PL2.

For example, in the cubic lattice member 6 shown in FIG. 5, the metallic cubic lattice member 6 is obtained which includes the unit members 50 (the first unit members 51 to the fourth unit member 54) each in which the two arms 135 connected to each other in the end portions 135a (base ends 137) on one side cross each other at the angle θ of less than 180 degrees. Then, for example, connecting the cubic lattice member 6 to the surface 11a of the metallic base material 11 in the end portion 135a on one side or the end portion 135a on the another side of the arm 135 by brazing or the like to be described later, the metal member 10 including the cubic lattice member 6 is obtained.

Providing the metal member 10 including the cubic lattice member 6 with the resin member 20 having the region embedding the cubic lattice member 6, the joint member 1 obtained by joining the metal member 10 and the resin member 20 is obtained.

In the joint member 1, the two arms 135 in each unit member 50 extend at different angles. Thus, if the force to causing separation or misalignment of the resin member 20 and the metal member 10 is applied to the joint member 1, in the cubic lattice member 6 and the region of the resin member 20 embedding the cubic lattice member 6, the force is applied in the direction different from the extending direction of at least one arm 135 of the above-described two arms 135. Thus, the phenomenon, in which the arm 135 falls out of the resin 21 in the extending direction of the arm 135, hardly occurs, making it possible to ensure the joint strength of the cubic lattice member 6 and the resin 21 embedding the cubic lattice member 6, and to improve the joint strength of the joint member 1.

That is, for example, using the cubic lattice member 6 shown in FIG. 5 to join the metal member 10 and the resin member 20 in the joint member 1, it is possible to improve the joint strength of the joint member 1.

For example, in the cubic lattice member 6 shown in FIG. 5, in each of the first unit member 51, the second unit member 52, the third unit member 53, and the fourth unit member 54, the angle θ formed by the two arms 135 may be an obtuse angle.

In the case where the cubic lattice member 6 is used to join the metal member 10 and the resin member 20 in the joint member 1 as described above, if the angle θ formed by the two arms 135 is the obtuse angle, an angle formed by each of the two arms 135 with the surface 11a of the base material 11 is small, relative to the case where the angle θ is an acute angle. Thus, if a force (shear force) to cause misalignment of the metal member 10 and the resin member 20 along the surface 11a of the base material 11 is applied to the joint member 1, on the arms 135 of each unit member 50, a force to bring down the arms 135 on the base material 11 hardly acts, and an external force along the extending direction of the arms 135 easily acts, improving a strength against the above-described shear force in each unit member 50. Thus, it is possible to improve the joint strength of the joint member 1 against the above-described shear force.

(Joining of Metal Member 10 and Resin Member 20)

Joining of the metal member 10 and the resin member 20 will now be described. In the following description, as an example of the joint member 1, for instance, a combustion chamber of a rocket engine will be described as an example.

Figure 7A:
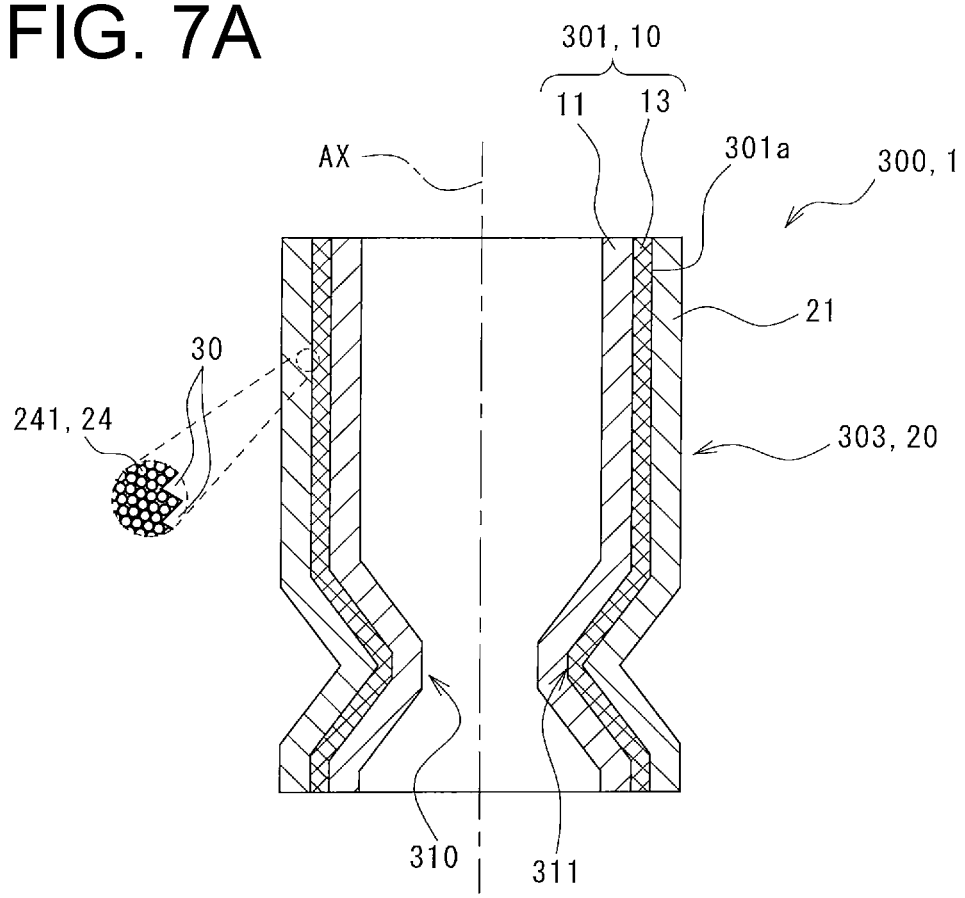
FIG. 7A is a schematic cross-sectional view showing a combustion chamber of a rocket engine as an example of the joint member.

FIG. 7A is a schematic cross-sectional view showing a combustion chamber 300 of the rocket engine as the example of the joint member 1, taken along an axis AX of the combustion chamber 300.

The combustion chamber 300 shown in FIG. 7A includes, for example, a copper-based alloy inner cylinder 301 and a resin outer cylinder 303 surrounding the outer circumference of the inner cylinder 301.

The combustion chamber 300 shown in FIG. 7A has a nozzle throat 310. Thus, the outer diameter of the combustion chamber 300 shown in FIG. 7A is small at a formation position of the nozzle throat 310. In the following description, a region, where the outer diameter of the combustion chamber 300 is small at the formation position of the nozzle throat 310, will be referred to as a recess 311.

In the combustion chamber 300 shown in FIG. 7A, the inner cylinder 301 corresponds to the above-described metal member 10, and the outer cylinder 303 corresponds to the resin member 20. In the combustion chamber 300 shown in FIG. 7A, the cubic lattice part 13 according to some embodiments described above is formed on an outer circumferential surface 301a of the inner cylinder 301.

In the combustion chamber 300 shown in FIG. 7A, a continuous fiber 24 of a carbon fiber wound around the outer circumferential surface 301a of the inner cylinder 301 is preferably wound around the outer cylinder 303. Thus, with the continuous fiber 24, it is possible to suppress radially outward expansion of the inner cylinder 301 by an inner pressure received by the inner cylinder 301 in combustion of a fuel in the combustion chamber 300. That is, it is possible to improve the strength of the combustion chamber 300 against an external force where a tension stress (circumferential stress) acts on the outer cylinder 303 along an extending direction of the continuous fiber 24.

Moreover, the continuous fiber 24 wound around the outer circumferential surface 301a of the inner cylinder 301 enters into a region between the plurality of protruding parts 30 of the cubic lattice part 13, for example, as shown in FIG. 7A, thereby suppressing misalignment, in particular, misalignment in the direction of the axis AX of the combustion chamber 300.

In the combustion chamber 300 shown in FIG. 7A, the inner cylinder 301 (metal member 10) has the recess 311 in a formation range of the cubic lattice part 13. In the combustion chamber 300 shown in FIG. 7A, it is preferable that the continuous fiber 24 is also wound around the recess 311. That is, the outer cylinder 303 (resin member 20) preferably includes the continuous fiber 24 wound around the recess 311.

For descriptive convenience, in the following description, the continuous fiber 24 wound along the circumferential direction of the outer circumferential surface 301a of the inner cylinder 301 will also be referred to as a first fiber 241.

Thus, it is possible to improve the strength of the joint member 1 against the external force where the tension stress acts on the resin member 20 along the extending direction of the first fiber 241.

In the combustion chamber 300 shown in FIG. 7A, the inner cylinder 301 (metal member 10) and the outer cylinder 303 (resin member 20) may be joined to be described below.

Figure 7B:
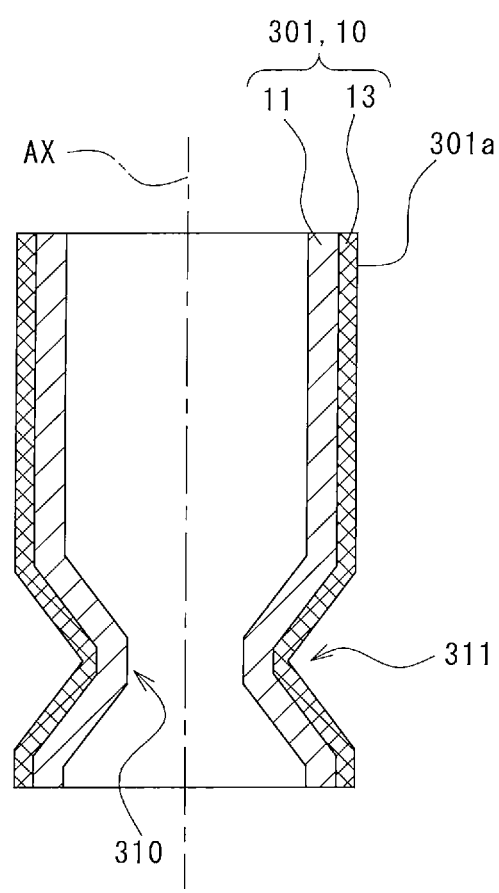
FIG. 7B is a schematic cross-sectional view of an inner cylinder before joined to an outer cylinder.

FIG. 7B is a schematic cross-sectional view of the inner cylinder 301 before joined to the outer cylinder 303.

That is, it is preferable that the continuous fiber 24 impregnated with the resin 21 by a filament winding method is wound around the outer circumferential surface 301a of the inner cylinder 301 as shown in FIG. 7B to form the outer cylinder 303, and then the resin 21 is cured.

Figure 8:
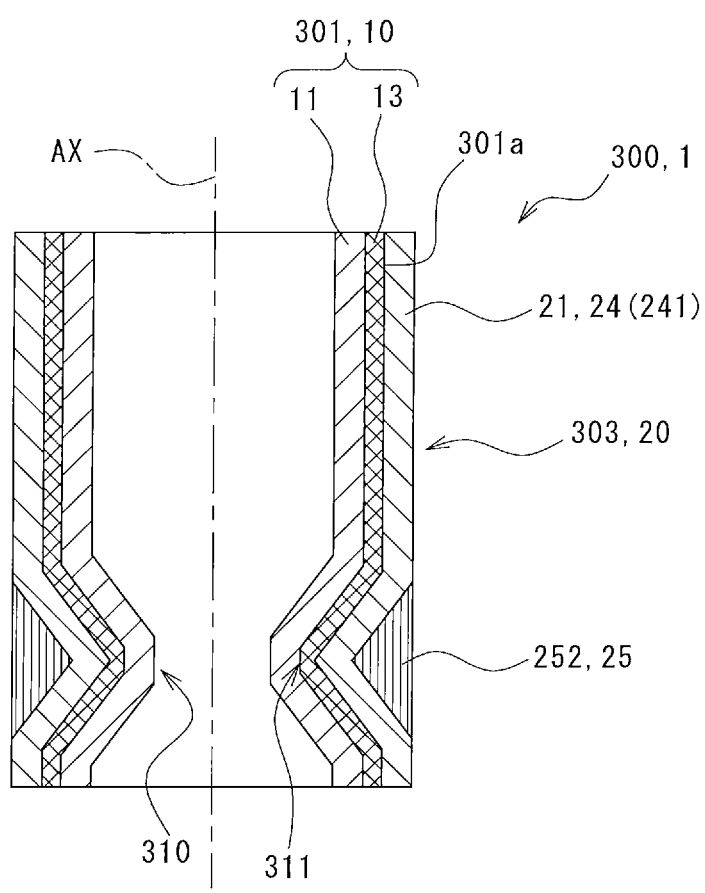
FIG. 8 is a schematic cross-sectional view of the combustion chamber according to another embodiment.

FIG. 8 is a schematic cross-sectional view of the combustion chamber 300 according to another embodiment. In the combustion chamber 300 shown in FIG. 8, the outer cylinder 303 (resin member 20) includes a second fiber 252 disposed in the recess 311 on the outer side of the continuous fiber 24 wound around the recess 311.

The second fiber 252 is a continuous fiber 25 extending along the axis AX of the combustion chamber 300 in the recess 311, preferably has a length from one end to another end of the recess 311 along the axis AX at a radial position where the continuous fiber 25 is disposed, and more preferably has a length capable of reciprocating between the one end and the another end a plurality of times.

For instance, in order to obtain the combustion chamber 300 shown in FIG. 8, an additive manufacturing device may be used which can perform, for example, on the combustion chamber 300 shown in FIG. 7A, additive manufacturing by, for example, the second fiber 252 and the resin 21 impregnated in the second fiber 252.

In the combustion chamber 300 shown in FIG. 8, the outer cylinder 303 (resin member 20) includes the second fiber 252 disposed in the above-described recess 311 on the outer side of the first fiber 241 and extending in a direction crossing the extending direction of the first fiber 241.

Thus, it is possible to improve a strength against an external force where a tension stress acts on the outer cylinder 303 (resin member 20) along an extending direction of the second fiber 252.

In particular, in the combustion chamber 300 shown in FIG. 8, even if a radial bending stress acts on an upper portion in the figure and a lower portion in the figure across the nozzle throat 310, the second fiber 252 bears the stress. Thus, it is possible to improve radial bending rigidity in the upper portion in the figure and the lower portion in the figure across the nozzle throat 310.

Figure 9A:
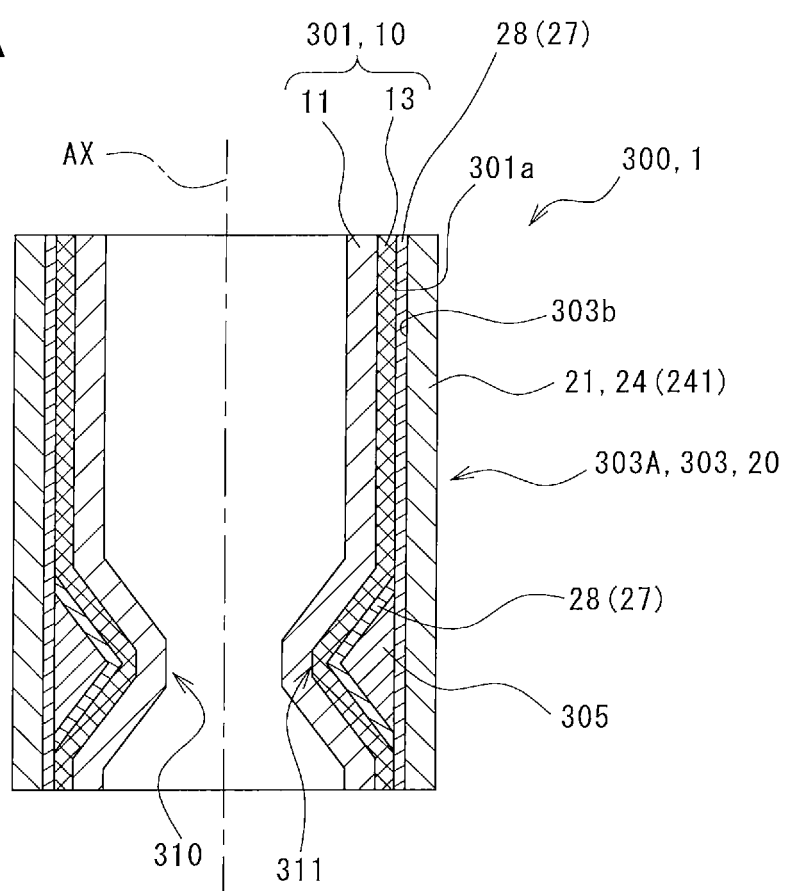
FIG. 9A is a schematic cross-sectional view of the combustion chamber according to still another embodiment.

FIG. 9A is a schematic cross-sectional view of the combustion chamber 300 according to still another embodiment. The combustion chamber 300 shown in FIG. 9A is obtained by, for example, covering the inner cylinder 301 with an outer cylindrical part 303A which is the outer cylinder 303 formed in advance, and joining the inner cylinder 301 and the outer cylindrical part 303A with a bonding agent 27.

In the combustion chamber 300 shown in FIG. 9A, it is preferable that, for example, a metallic or CFRP insert member 305 is disposed in the recess 311, and a relatively large space does not remain between the inner cylinder 301 and the outer cylindrical part 303A at an axial position corresponding to the nozzle throat 310.

Figure 9B:
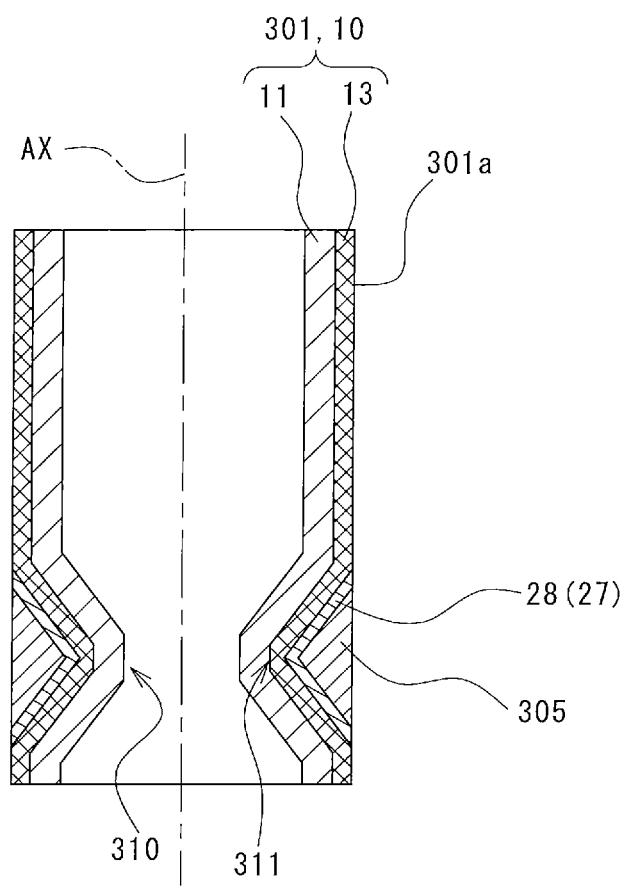
FIG. 9B is a schematic cross-sectional view of the combustion chamber before covered with an outer cylindrical part.

FIG. 9B is a schematic cross-sectional view of the combustion chamber 300 before covered with the outer cylindrical part 303A.

Figure 9C:
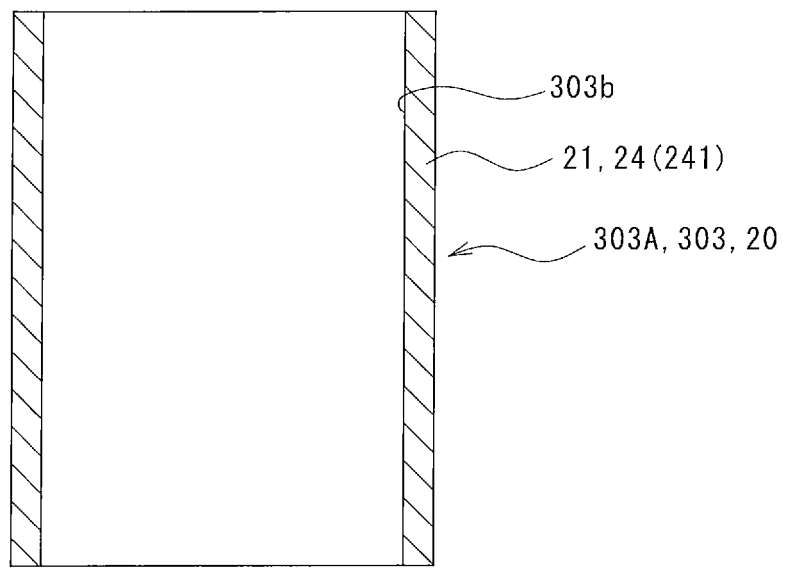
FIG. 9C is a schematic cross-sectional view of the outer cylindrical part.

FIG. 9C is a schematic cross-sectional view of the outer cylindrical part 303A.

In the combustion chamber 300 shown in FIG. 9A, the inner cylinder 301 (metal member 10) and the outer cylinder 303 (resin member 20) may be joined to be described below.

In joining the inner cylinder 301 (metal member 10) and the outer cylinder 303 (resin member 20), for example, as shown in FIG. 9B, the insert member 305 is disposed in the recess 311. The insert member 305 may be joined to the recess 311 with, for example, the bonding agent 27.

After the insert member 305 is disposed in the recess 311, the inner cylinder 301 is covered with the outer cylindrical part 303A formed in advance. The outer cylindrical part 303A shown in FIGS. 9A and 9C preferably includes the above-described first fiber 241.

After the inner cylinder 301 is covered with the outer cylindrical part 303A, the bonding agent 27 is supplied between the outer circumferential surface 301a of the inner cylinder 301 and an inner circumferential surface 303b of the outer cylinder 303 (outer cylindrical part 303A) to join the inner cylinder 301 and the outer cylindrical part 303A. The bonding agent 27 permeates a cavity inside the above-described cubic lattice part 13. The bonding agent is solidified, thereby forming a bonding layer 28 for bonding the inner cylinder 301 and the outer cylindrical part 303A.

That is, the combustion chamber 300 shown in FIG. 9A includes the insert member 305 disposed in the recess 311. The inner cylinder 301 (metal member 10) has a cylindrical shape, where the cubic lattice part 13 is formed on the outer circumferential surface 301a, and forms the recess 311 constricted in the radial direction. The resin member 20 includes the outer cylindrical part 303A and the bonding layer 28. The outer cylindrical part 303A includes the first fiber 241 wound in the circumferential direction of the inner cylinder 301 (metal member 10), and externally covers the inner cylinder 301 (metal member 10) and the insert member 305 disposed in the above-described recess 311. The bonding layer 28 is disposed between the inner circumferential surface 303b of the outer cylindrical part 303A and the outer circumferential surface 301a of the inner cylinder 301, and bonds the outer cylindrical part 303A and the inner cylinder 301.

Thus, the inner cylinder 301 and the insert member 305 disposed in the above-described recess 311 are covered with the outer cylindrical part 303A, and the inner circumferential surface 303b of the outer cylindrical part 303A and the outer circumferential surface 301a of the inner cylinder 301 are bonded by the bonding agent 27, thereby easily obtaining the combustion chamber 300 shown in FIG. 9A.

Moreover, according to the combustion chamber 300 shown in FIG. 9A, if a pressure acts on the inside of the inner cylinder 301 having the cylindrical shape, the first fiber 241 of the outer cylindrical part 303A suppresses radial expansion of the inner cylinder 301, making it possible to improve pressure resistance of the inner cylinder 301.

Since the insert member 305 and the outer cylindrical part 303A via the bonding layer 28 exist on the radially outer side of the above-described recess 311, the radial expansion is suppressed even if the pressure acts on the inside of the inner cylinder 301 having the cylindrical shape in the above-described recess 311.

(Flowchart of Method for Producing Joint Member 1)

Figure 10A:
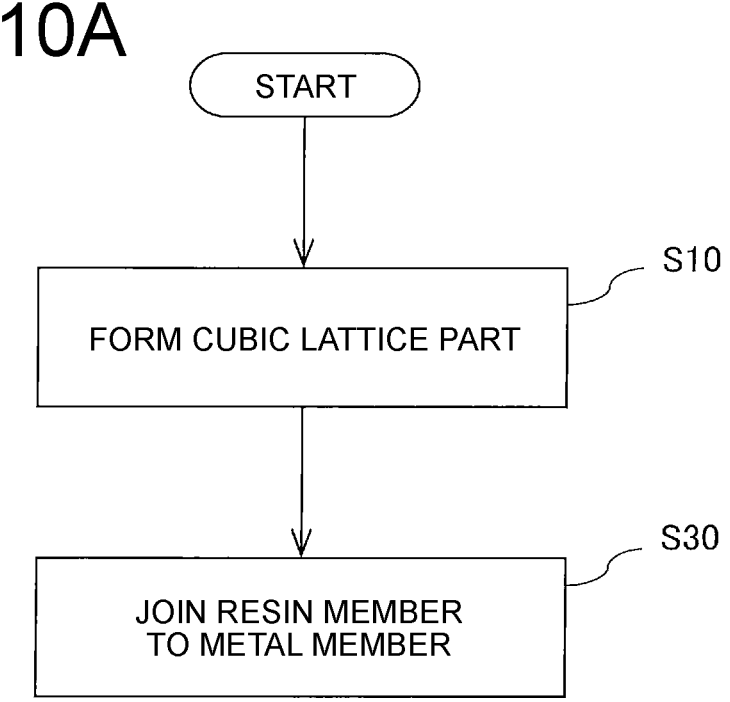
FIG. 10A is a flowchart showing a procedure of a method for producing the joint member according to some embodiments.

FIG. 10A is a flowchart showing a procedure of a method for producing the joint member 1 according to some embodiments.

As shown in FIG. 10A, the method for producing the joint member 1 according to some embodiments includes a step S10 of forming the cubic lattice part 13 on the surface 11a of the base material 11 in the metal member 10, and a step S30 of joining the resin member 20 to the metal member 10 by embedding the cubic lattice part 13 with the resin 21. The step 10 of forming the cubic lattice part 13 includes forming the cubic lattice part 13 to include the plurality of lattice points 131 and the plurality of arms 135 connecting the lattice points 131, respectively, as well as forming the cubic lattice part 13 such that, of the plurality of lattice points 131, the outermost lattice point 133 far from the surface 11a of the base material 11 includes at least three lattice points 131 forming the inclined surface 143 with respect to the above-described surface 11a.

That is, in the method for producing the joint member 1 according to some embodiments shown in FIG. 10A, the step S10 of forming the cubic lattice part 13 includes forming the cubic lattice part 13 shown in FIGS. 3A to 3G described above on the surface 11a of the base material 11. In the step S10 of forming the cubic lattice part 13, as described above, using, for example, the three-dimensional additive manufacturing device, it is possible to integrally model the cubic lattice part 13 and the base material 11 by the various additive manufacturing methods.

In the step S30 of joining the resin member 20 to the metal member 10, for example, as described above, the continuous fiber 24 impregnated with the resin 21 by the filament winding method may be wound around the metal member 10 (for example, the inner cylinder 301) to form the resin member 20 (for example, the outer cylinder 303), and then the resin 21 may be cured. Moreover, in the step S30 of joining the resin member 20 to the metal member 10, for example, as described above, after the inner cylinder 301 may be covered with the resin member 20 (for example, the outer cylindrical part 303A) formed in advance, the bonding agent 27 may be supplied between the outer circumferential surface 301a of the inner cylinder 301 and the inner circumferential surface 303b of the outer cylindrical part 303A to join the inner cylinder 301 and the outer cylindrical part 303A.

With the method for producing the joint member 1 according to some embodiments shown in FIG. 10A, since the cubic lattice part 13 is formed to have the above-described inclined surface 143 formed by the at least three outermost lattice points 133, the size of the cubic lattice part 13 gradually changes depending on the position in the normal direction DN of the surface 11a of the base material 11. Therefore, if the above-described inclined surface 143 is formed such that the size of the cubic lattice part 13 gradually decreases with distance from the surface 11a of the base material 11, that is, the size of the cubic lattice part 13 gradually increases toward the surface 11a of the base material 11, the proportion of the arm 135 per unit volume gradually increases toward the surface 11a of the base material 11, and the proportion of the resin 21 per unit volume gradually increases with distance from the surface 11a of the base material 11.

Therefore, with the method for producing the joint member 1 according to some embodiments shown in FIG. 10A, in the joint member 1, it is possible to suppress the increase in stress of the arm 135 and the increase in stress of the resin 21 embedding the cubic lattice part 13, it is possible to ensure the respective strengths of the cubic lattice part 13 and the resin 21 embedding the cubic lattice part 13, and to improve the joint strength of the joint member 1.

In addition, with the method for producing the joint member 1 according to some embodiments shown in FIG. 10A, since the cubic lattice part 13 is formed such that the proportion of the arm 135 per unit volume and the proportion of the resin 21 per unit volume described above gradually change in accordance with the distance from the surface 11a of the base material 11, it is possible to mitigate the thermal stress caused by the difference in linear expansion coefficient between the base material 11 (metal member 10) and the resin member 20, in the joint member 1.

In the method for producing the joint member 1 according to some embodiments shown in FIG. 10A, the step S10 of forming the cubic lattice part 13 may include brazing the cubic lattice part 13 to the base material 11, as described with reference to FIG. 6A.

Thus, it is also possible to braze the cubic lattice part 13 formed by, for example, the three-dimensional additive manufacturing device to the large base material 11 which is formed by, for example, casting or machining and cannot be formed by the three-dimensional additive manufacturing device. Thus, it is possible to hardly be restricted by the size of the metal member 10.

For example, as described above, if the metal member 10 (for example, the inner cylinder 301) has the recess 311 in the formation range of the cubic lattice part 13, the step S30 of joining the resin member 20 to the metal member 10 preferably includes joining the resin member 20, which includes the first fiber 241 wound around the recess 311, to the metal member 10.

That is, the step S30 of joining the resin member 20 to the metal member 10 preferably includes, for example, winding the continuous fiber 24 impregnated with the resin 21 by the filament winding method around the outer circumferential surface 301a of the inner cylinder 301 as shown in FIG. 7B to form the outer cylinder 303, and then curing the resin 21.

Thus, it is possible to improve the strength of the joint member 1 against the external force where the tension stress acts on the resin member 20 along the extending direction of the first fiber 241.

FIG. 10B is a flowchart showing a procedure of the method for producing the joint member 1 according to another embodiment.

As shown in FIG. 10B, the method for producing the joint member 1 according to some embodiments further includes a step S20 of joining the base material 11, where the cubic lattice part 13 is formed, to the metallic base 19, in addition to the step S10 of forming the cubic lattice part 13 and the step S30 of joining the resin member 20 to the metal member 10.

That is, in the method for producing the joint member 1 according to some embodiments shown in FIG. 10B, the step S20 of joining the base material 11 and the base 19 may include joining the metal member 10 including the cubic lattice part 13 to the metallic base 19 by, for example, welding, as described with reference to FIG. 6B.

With the method for producing the joint member 1 according to the another embodiment shown in FIG. 10B, it is also possible to join the metal member 10 formed by, for example, the three-dimensional additive manufacturing device to the large base 19 which is formed by, for example, casting or machining and cannot be formed by the three-dimensional additive manufacturing device. Thus, it is possible to hardly be restricted by the size of the base 19.

The present disclosure is not limited to the above-described embodiments, and also includes an embodiment obtained by modifying the above-described embodiments and an embodiment obtained by combining these embodiments as appropriate.

The contents described in the above embodiments would be understood as follows, for instance.

(1) A joint member 1 according to at least one embodiment of the present disclosure includes a resin member 20, and a metal member 10 which includes a base material 11, and a cubic lattice part 13 formed on a surface 11a of the base material 11 and embedded with the resin member 20. The cubic lattice part 13 includes a plurality of lattice points 131 and a plurality of arms 135 connecting the lattice points 131, respectively. Of the plurality of lattice points 131, an outermost lattice point 133 far from the surface 11a of the base material 11 includes at least three lattice points 131 forming an inclined surface 143 with respect to the above-described surface 11a.

With the above configuration (1), it is possible to suppress the increase in stress of the arm 135 and the increase in stress of the resin 21 embedding the cubic lattice part 13, making it possible to ensure the respective strengths of the cubic lattice part 13 and the resin 21 embedding the cubic lattice part 13, and to improve the joint strength of the joint member 1.

In addition, with the above configuration (1), since the proportion of the arm 135 per unit volume and the proportion of the resin 21 per unit volume described above gradually change in accordance with the distance from the surface 11a of the base material 11, it is possible to mitigate the thermal stress caused by the difference in linear expansion coefficient between the base material 11 (metal member 10) and the resin member 20.

(2) In some embodiments, in the above configuration (1), the cubic lattice part 13 includes a protruding part 30 having the above-described inclined surface 143 and protruding in a direction separating from the above-described surface 11a.

With the above configuration (2), the above-described proportion of the arm 135 per unit volume and proportion of the resin 21 per unit volume in the protruding part 30 gradually change in accordance with the distance from the surface 11a of the base material 11. Thus, it is possible to suppress the increase in stress of the arm 135 in the protruding part 30 and to suppress the increase in stress of the resin 21 present at the position where the position from the surface 11a of the base material 11 is the same as the protruding part 30, that is, the resin 21 embedding the protruding part 30, making it possible to ensure the respective strengths of the protruding part 30 and the resin 21 embedding the protruding part 30, and to improve the joint strength of the joint member 1.

(3) In some embodiments, in the above configuration (1) or (2), the cubic lattice part 13 has a structure in which a unit lattice 40 or a unit structure 41 formed by the plurality of arms 135 repeatedly appears, and the unit lattice 40 or the unit structure 41 decreases in number with distance from the above-described surface 11a.

With the above configuration (3), the proportion of the arm 135 per unit volume gradually increases toward the surface 11a of the base material 11, and the proportion of the resin 21 per unit volume gradually increases with distance from the surface 11a of the base material 11.

Therefore, with the above configuration (3), since it is possible to suppress the increase in stress of the arm 135 and the increase in stress of the resin 21 embedding the cubic lattice part 13, it is possible to ensure the respective strengths of the cubic lattice part 13 and the resin 21 embedding the cubic lattice part 13, and to improve the joint strength of the joint member 1.

(4) In some embodiments, in any one of the above configurations (1) to (3), the protruding part 30 may be a pyramid part 30 formed by a plurality of inclined surfaces 143.

With the above configuration (4), the above-described proportion of the arm 135 per unit volume and proportion of the resin 21 per unit volume in the pyramid part 30 gradually change in accordance with the distance from the surface 11a of the base material 11. Thus, it is possible to suppress the increase in stress of the arm 135 in the pyramid part 30 and to suppress the increase in stress of the resin 21 present at the position where the position from the surface 11a of the base material 11 is the same as the pyramid part 30, that is, the resin 21 embedding the pyramid part 30, making it possible to ensure the respective strengths of the pyramid part 30 and the resin 21 embedding the pyramid part 30, and to improve the joint strength of the joint member 1.

(5) In some embodiments, in any one of the above configurations (1) to (4), the cubic lattice part 13 is brazed to the base material 11.

With the above configuration (5), it is also possible to braze the cubic lattice part 13 formed by, for example, the three-dimensional additive manufacturing device to the relatively large base material 11 which is formed by, for example, casting or machining and cannot be formed by the three-dimensional additive manufacturing device. Thus, it is possible to hardly be restricted by the size of the metal member 10.

(6) In some embodiments, in any one of the above configurations (1) to (5), the joint memberl further includes a metallic base 19 joined to the base material 11 where the cubic lattice part 13 is formed.

With the above configuration (6), it is also possible to join the metal member 10 formed by, for example, the three-dimensional additive manufacturing device to the relatively large base 19 which is formed by, for example, casting or machining and cannot be formed by the three-dimensional additive manufacturing device. Thus, it is possible to hardly be restricted by the size of the base 19.

(7) In some embodiments, in any one of the above configurations (1) to (6), the resin member 20 includes a fiber 23 entering into a range where the above-described inclined surface 143 exists in a normal direction DN of the above-described surface 11a.

With the above configuration (7), with the fiber 23 entering into the range where the above-described inclined surface 143 exists in the normal direction DN of the above-described surface 11a, it is possible to improve the strength of the resin 21 embedding the cubic lattice part 13, and to improve the joint strength of the joint member 1.

(8) In some embodiments, in the above configuration (7), the above-described fiber 23 has a length which is not less than 0.5 times and not greater than 10 times of a length of each of the arms 135.

With the above configuration (8), since the fiber 23 easily enters into even the inside of the cubic lattice part 13, it is possible to improve the strength of the resin 21 embedding the cubic lattice part 13, and to improve the joint strength of the joint member 1.

(9) In some embodiments, in the above configuration (7), the above-described fiber 23 has a length which is not less than 10 times of a length of each of the arms 135, and extends in a direction crossing the above-described normal direction DN in the range where the above-described inclined surface 143 exists in the above-described normal direction DN.

With the above configuration (9), it is possible to improve the strength of the joint member 1 against the external force where the tension stress acts on the resin member 20 along the extending direction of the above-described fiber 23.

(10) In some embodiments, in any one of the above configurations (1) to (9), the metal member 10 has a recess 311 in a formation range of the cubic lattice part 13, and the resin member 20 includes a first fiber 241 wound around the recess 311.

With the above configuration (10), it is possible to improve the strength of the joint member 1 against the external force where the tension stress acts on the resin member 20 along the extending direction of the first fiber 241.

(11) In some embodiments, in the above configuration (10), the resin member 20 includes a second fiber 252 disposed in the above-described recess 311 on an outer side of the first fiber 241 and extending in a direction crossing an extending direction of the first fiber 241.

With the above configuration (11), it is possible to improve the strength against the external force where the tension stress acts on the resin member 20 along the extending direction of the second fiber 252.

(12) In some embodiments, in any one of the above configurations (1) to (9), the joint member 1 further includes an insert member 305 disposed in a following recess 311.

The metal member 10 (inner cylinder 301) has a cylindrical shape, where the cubic lattice part 13 is formed on an outer circumferential surface 301*a* thereof, and forms the recess 311 constricted in a radial direction, and the resin member 20 includes an outer cylindrical part 303A and a bonding layer 28, the outer cylindrical part 303A including a first fiber 241 wound in a circumferential direction of the metal member 10 (inner cylinder 301), and externally covering the metal member 10 (inner cylinder 301) and the insert member 305 disposed in the above-described recess 311, the bonding layer 28 being disposed between an inner circumferential surface 303*b* of the outer cylindrical part 303A and the outer circumferential surface 301*a* of the metal member 10 (inner cylinder 301), and bonding the outer cylindrical part 303A and the metal member10 (inner cylinder 301).

With the above configuration (12), the metal member 10 (inner cylinder 301) and the insert member 305 disposed in the above-described recess 311 are covered with the outer cylindrical part 303A, and the inner circumferential surface 303*b* of the outer cylindrical part 303A and the outer circumferential surface 301*a* of the metal member 10 (inner cylinder 301) are bonded by the bonding agent 27, thereby easily obtaining the joint member 1 by the above configuration (12).

Moreover, with the above configuration (12), if a pressure acts on the inside of the metal member 10 (inner cylinder 301) having the cylindrical shape, the first fiber 241 of the outer cylindrical part 303A suppresses radial expansion of the metal member 10 (inner cylinder 301), making it possible to improve pressure resistance of the metal member 10 (inner cylinder 301).

Since the insert member 305 and the outer cylindrical part 303A via the bonding layer 28 exist on the radially outer side of the above-described recess 311, the radial expansion is suppressed even if the pressure acts on the inside of the metal member 10 (inner cylinder 301) having the cylindrical shape in the above-described recess 311.

(13) A joint member 1 according to at least one embodiment of the present disclosure includes a resin member 20, and a metal member 10 which includes a base material 11, and a cubic lattice part 13 formed on a surface 11*a* of the base material 11 and embedded with the resin member 20. The cubic lattice part 13 includes a plurality of lattice points 131, and a plurality of arms 135 connecting the plurality of lattice points 131 and the surface 11*a* of the base material 11. The plurality of lattice points 131 are each a connection point of respective tip ends 136 of two arms 135 extending toward the lattice point 131 from a side of the base material 11.

With the above configuration (13), the two arms 135 extending from the side of the base material 11 toward the same lattice point 131 extend at different angles. Thus, if a force to causing separation or misalignment of the resin member 20 and the metal member 10 is applied to the joint member 1, in the cubic lattice part 13 and the region of the resin member 20 embedding the cubic lattice part 13, the force is applied in a direction different from an extending direction of at least one arm 135 of the above-described two arms 135. Thus, a phenomenon, in which the arm 135 falls out of the resin 21 in the extending direction of the arm 135, hardly occurs, making it possible to ensure the joint strength of the cubic lattice part 13 and the resin 21 embedding the cubic lattice part 13, and to improve the joint strength of the joint member 1.

(14) In some embodiments, in the above configuration (13), the cubic lattice part 13 includes at least two pairs of a pair (unit member 50) of the above-described two arms 135, and one arm 135 in one pair (unit member 50) of the above-described two pairs (two unit members 50) of arms 135 has a base end 137 connected to a base end 137 of one arm 135 in another pair (unit member 50) of the two pairs of arms 135.

With the above configuration (14), with the cubic lattice part 13 where not less than two pairs of the pair (unit member 50) of arms 135 are continuously formed, it is possible to ensure the joint strength of the cubic lattice part 13 and the resin 21 embedding the cubic lattice part 13, and to improve the joint strength of the joint member 1.

(15) In some embodiments, in the above configuration (14), the above-described two arms 135 in the one pair (unit member 50) and the above-described two arms 135 in the another pair (unit member 50) are included in the same plane (a plane PLa to a plane PLd).

With the above configuration (15), it is possible to increase the size of the cubic lattice part 13 along the above-described plane (the plane PLa to the plane PLd).

(16) In some embodiments, in the above configuration (14), a plane (for example, the above-described plane PLa) where the above-described two arms 135 in the one pair (unit member 50) are included and a plane (for example, any one of the above-described plane PLb to the plane PLd) where the above-described two arms 135 in the another pair (unit member 50) are included cross each other.

With the above configuration (16), it is possible to increase the size of the cubic lattice part 13 along the surface 11*a* of the base material 11.

(17) In some embodiments, in any one of the above configurations (14) to (16), a distance between the surface 11*a* of the base material 11 and the lattice point 131 where the above-described two arms 135 in the one pair (unit member 50) are connected is equal to a distance between the above-described surface 11*a* and the lattice point 131 where the above-described two arms 135 in the another pair (unit member 50) are connected.

With the above configuration (17), it is possible to form the cubic lattice part 13 including the plurality of lattice points 131 which are equal in distance from the surface 11*a* of the base material 11.

(18) In some embodiments, in any one of the above configurations (14) to (16), a distance between the surface 11*a* of the base material 11 and the lattice point 131 where the above-described two arms 135 in the one pair (unit member 50) are connected is different from a distance between the above-described surface 11*a* and the lattice point 131 where the above-described two arms 135 in the another pair (unit member 50) are connected.

With the above configuration (18), it is possible to form the cubic lattice part 13 including the lattice point 131 which is different from the other lattice points 131 in distance from the surface 11*a* of the base material 11.

(19) A cubic lattice member 6 according to at least one embodiment of the present disclosure at least includes a first unit member 51, a second unit member 52, a third unit member 53, and a fourth unit member 54 each including metallic two arms 135 which, respectively, have end portions 135*a* (tip ends 136) on one side connected to each other and have end portions 135*a* (base ends 137) on another side separated from each other, the two arms 135 forming an angle θ of less than 180 degrees. The first unit member 51, the second unit member 52, the third unit member 53, and the fourth unit member 54 are connected to each other in the end portion 135*a* (base end 137) on the another side of one of the above-described two arms 135 in each of the first unit member 51, the second unit member 52, the third unit member 53, and the fourth unit member 54. A first plane PL1 where the above-described two arms 135 in the first unit member 51 are included is the same as a second plane PL2 where the above-described two arms 135 in the second unit member 52 are included. A third plane PL3 where the above-described two arms 135 in the third unit member 53 are included is the same as a fourth plane PL4 where the above-described two arms 135 in the fourth unit member 54 are included, and is different from the first plane PL1 and the second plane PL2.

Using the cubic lattice member 6 with the above configuration (19) to join the metal member 10 and the resin member 20 in the joint member 1, it is possible to improve the joint strength of the joint member 1.

(20) In some embodiments, in the above configuration (19), in each of the first unit member 51, the second unit member 52, the third unit member 53, and the fourth unit member 54, the angle θ formed by the above-described two arms 135 is an obtuse angle.

In the case where the cubic lattice member 6 is used to join the metal member 10 and the resin member 20 in the joint member 1 as described above, with the above configuration (20), an angle formed by each of the above-described two arms 135 with the surface 11a of the base material 11 is small, relative to the case where the angle θ formed by the above-described two arms 135 is the acute angle. Thus, if the force (shear force) to cause misalignment of the metal member 10 and the resin member 20 along the surface 11a of the base material 11 is applied to the joint member 1, on the arms 135 of each unit member 50, the force to bring down the arms 135 on the base material 11 hardly acts, and the external force along the extending direction of the arms 135 easily acts, improving the strength against the above-described shear force in each unit member 50. Thus, it is possible to improve the joint strength of the joint member 1 against the above-described shear force.

(21) A method for producing a joint member 1 according to at least one embodiment of the present disclosure includes a step S10 of forming a cubic lattice part 13 on a surface 11a of a base material 11 in a metal member 10, and a step S30 of joining a resin member 20 to the metal member 10 by embedding the cubic lattice part 13 with a resin 21. The step S10 of forming the cubic lattice part 13 includes forming the cubic lattice part 13 to include a plurality of lattice points 131 and a plurality of arms 135 connecting the lattice points 131, respectively, as well as forming the cubic lattice part 13 such that, of the plurality of lattice points 131, an outermost lattice point 133 far from the surface 11a of the base material 11 includes at least three lattice points 131 forming an inclined surface 143 with respect to the above-described surface 11a.

With the above method (21), in the joint member 1, it is possible to suppress the increase in stress of the arm 135 and the increase in stress of the resin 21 embedding the cubic lattice part 13, making it possible to ensure the respective strengths of the cubic lattice part 13 and the resin 21 embedding the cubic lattice part 13, and to improve the joint strength of the joint member 1.

In addition, with the above method (21), since the cubic lattice part 13 is formed such that the proportion of the arm 135 per unit volume and the proportion of the resin 21 per unit volume described above gradually change in accordance with the distance from the surface 11a of the base material 11, it is possible to mitigate the thermal stress caused by the difference in linear expansion coefficient between the base material 11 (metal member 10) and the resin member 20, in the joint member 1.

(22) In some embodiments, in the above method (21), the step S10 of forming the cubic lattice part 13 includes brazing the cubic lattice part 13 to the base material 11.

With the above method (22), it is also possible to braze the cubic lattice part 13 formed by, for example, the three-dimensional additive manufacturing device to the large base material 11 which is formed by, for example, casting or machining and cannot be formed by the three-dimensional additive manufacturing device. Thus, it is possible to hardly be restricted by the size of the metal member 10.

(23) In some embodiments, in the above method (21) or (22), the method for producing the joint member 1 further includes a step S20 of joining a metallic base 19 to the base material 11 where the cubic lattice part 13 is formed.

With the above method (23), it is also possible to join the metal member 10 formed by, for example, the three-dimensional additive manufacturing device to the large base 19 which is formed by, for example, casting or machining and cannot be formed by the three-dimensional additive manufacturing device. Thus, it is possible to hardly be restricted by the size of the base 19.

(24) In some embodiments, in the above method (21), the metal member 10 has a recess 311 in a formation range of the cubic lattice part 13, and the step S30 of joining the resin member 20 to the metal member 10 includes joining the resin member 20, which includes a first fiber 241 wound around the above-described recess 311, to the metal member 10.

With the above method (24), it is possible to improve the strength of the joint member 1 against the external force where the tension stress acts on the resin member 20 along the extending direction of the first fiber 241.

The invention claimed is:

1. A joint member, comprising:
a resin member; and
a metal member which includes a base material, and a cubic lattice part formed on a surface of the base material and embedded with the resin member,
wherein the cubic lattice part includes a plurality of lattice points and a plurality of arms connecting the lattice points, respectively, and
wherein, of the plurality of lattice points, an outermost lattice point that is farthest from the surface of the base material includes at least three lattice points forming an inclined surface with respect to the surface of the base material.

2. The joint member according to claim 1,
wherein the cubic lattice part includes a protruding part having the inclined surface and protruding in a direction separating from the surface of the base material.

3. The joint member according to claim 1,
wherein the cubic lattice part has a structure in which a unit lattice or a unit structure formed by the plurality of arms repeatedly appears, and
wherein the unit lattice or the unit structure decreases in number with distance from the surface of the base material.

4. The joint member according to claim 2,
wherein the protruding part is a pyramid part formed by a plurality of inclined surfaces.

5. The joint member according to claim 1,
wherein the cubic lattice part is brazed to the base material.

6. The joint member according to claim 1, further comprising:
a metallic base joined to the base material where the cubic lattice part is formed.

7. The joint member according to claim 1,
wherein the cubic lattice part includes a first protruding part having the inclined surface and a second protruding part having an inclined surface, the first and second protruding parts protruding in a direction separating from the surface of the base material, and
wherein the resin member includes a fiber which is present in a region between the inclined surfaces of the first and second protruding parts.

8. The joint member according to claim 1,
wherein the joint member comprises a combustion chamber having a cylindrical body,
wherein the metal member has a cylindrical shape in which the cubic lattice part is formed on an outer circumference of the metal member, and the resin member surrounds the outer circumference of the metal member such that the metal member and the resin member form the cylindrical body,
wherein a recess is formed in a portion of a circumference of the cylindrical body, and a wall of the recess is formed by the base material, the cubic lattice part and the resin member, and
wherein the resin member includes a continuous first fiber wound around the cubic lattice part.

9. The joint member according to claim 8,
wherein the resin member includes a continuous second fiber disposed in the recess on an outer side of the continuous first fiber and extending in a direction crossing an extending direction of the continuous first fiber.

10. The joint member according to claim 1,
wherein the metal member has a cylindrical shape, where the cubic lattice part is formed on an outer circumference of the metal member, and forms a recess constricted in a radial direction,
wherein the joint member further comprises an insert member disposed in the recess, and
wherein the resin member includes an outer cylindrical part and a bonding layer, the outer cylindrical part including a continuous first fiber wound in a circumferential direction of the metal member, and externally covering the metal member and the insert member disposed in the recess, the bonding layer being disposed between an inner circumferential surface of the outer cylindrical part and the outer circumferential surface of the metal member, and bonding the outer cylindrical part and the metal member.

11. A method for producing a joint member, comprising:
forming a cubic lattice part on a surface of a base material in a metal member; and
joining a resin member to the metal member by embedding the cubic lattice part with a resin,
wherein the forming of the cubic lattice part includes forming the cubic lattice part to include a plurality of lattice points and a plurality of arms connecting the lattice points, respectively, as well as forming the cubic lattice part such that, of the plurality of lattice points, an outermost lattice point that is farthest from the surface of the base material includes at least three lattice points forming an inclined surface with respect to the surface of the base material.

12. The method for producing the joint member according to claim 11,
wherein the forming of the cubic lattice part includes brazing the cubic lattice part to the base material.

13. The method for producing the joint member according to claim 11, further comprising:
joining a metallic base to the base material where the cubic lattice part is formed.

14. The method for producing the joint member according to claim 11,
wherein the metal member has a recess in a formation range of the cubic lattice part, and
wherein the joining of the resin member to the metal member includes joining the resin member, which includes a continuous first fiber wound around the recess, to the metal member.

15. The joint member according to claim 1, wherein the metal member has a cylindrical shape, the resin member includes a continuous first fiber, and the continuous first fiber is wound around the metal member.

* * * * *